United States Patent [19]

Henley et al.

[11] 4,239,565

[45] Dec. 16, 1980

[54] OFF-THE-HIGHWAY RADIAL TIRE BUILDING SYSTEM

[75] Inventors: Virgil E. Henley, Akron; James R. Hineborg, Cuyahoga Falls; Donald H. Nixdorf, Canton, all of Ohio

[73] Assignee: The General Tire & Rubber Company, Akron, Ohio

[21] Appl. No.: 528,175

[22] Filed: Nov. 29, 1974

[51] Int. Cl.$^3$ ............................................. B29H 17/10
[52] U.S. Cl. ................. 156/126; 156/128 N; 156/414; 156/416
[58] Field of Search ............... 156/128 R, 128 I, 126, 156/127, 110 R, 125, 414, 415, 416, 123 N

[56] References Cited

U.S. PATENT DOCUMENTS

| | | | |
|---|---|---|---|
| 1,374,505 | 4/1921 | Hopkinson | 156/123 |
| 2,824,336 | 3/1953 | Weigold et al. | 156/414 |
| 2,974,714 | 3/1961 | Kraft | 156/127 |
| 3,364,093 | 1/1968 | Porter | 156/128 I |
| 3,374,138 | 3/1968 | Porter et al. | 156/416 X |
| 3,388,024 | 6/1968 | Black et al. | 156/415 |
| 3,738,893 | 6/1973 | Edler | 156/128 R |
| 3,740,292 | 6/1973 | Leblond | 156/126 |
| 3,867,229 | 2/1975 | Marra | 156/417 |
| 3,909,337 | 9/1975 | Yabe | 156/128 |

FOREIGN PATENT DOCUMENTS

| | | | |
|---|---|---|---|
| 239897 | 7/1962 | Australia | 156/126 |
| 689253 | 6/1964 | Canada | 156/128 |

OTHER PUBLICATIONS

Whittlington's Dictionary of Plastics, Whittington, Lloyd R. Pub. by Society of Plastics Engineers & Technomic Publishing Co., Inc., 750 Summer St., Stamford, Conn., 06902, Copyright 1968, p. 173.

Primary Examiner—John E. Kittle

[57] ABSTRACT

A method and apparatus for making a pneumatic tire and particularly a giant off-the-highway radial type pneumatic tire is provided preferably by first forming a tire carcass around a tire carcass building drum and transporting the tire carcass to a second stage tire building machine by a carcass transport support means. The second stage machine comprises a first rotatable detachable building drum on a first shaft preferably capable of vertical positioning for placing the tire carcass on the first drum. The first drum is adapted to expand the tire carcass to a substantially toric configuration. A second rotatable collapsible drum for building a breaker assembly is mounted on a second shaft coaxially of the first shaft. Breaker transfer means travels over and between the drums to transfer the breaker assembly from the second drum to the first drum. When the breaker assembly is positioned over the first drum, the carcass is expanded into a toric configuration and mates with the breaker assembly. The combined breaker assembly and carcass is then stitched, and tread portion applied, and the detachable building drum with the assembled tire thereon is placed in a curing means such as a mold or pot heater.

21 Claims, 22 Drawing Figures

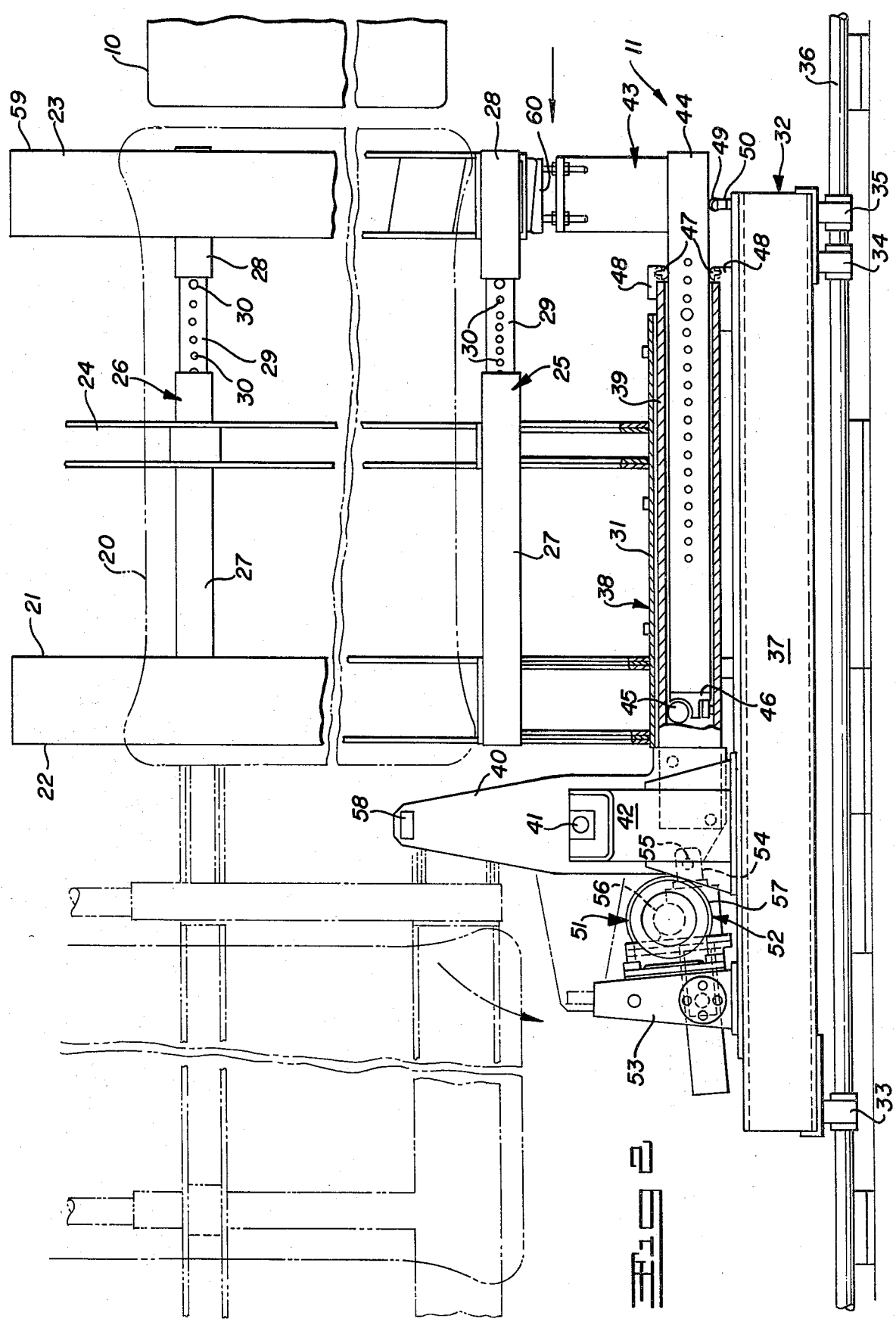

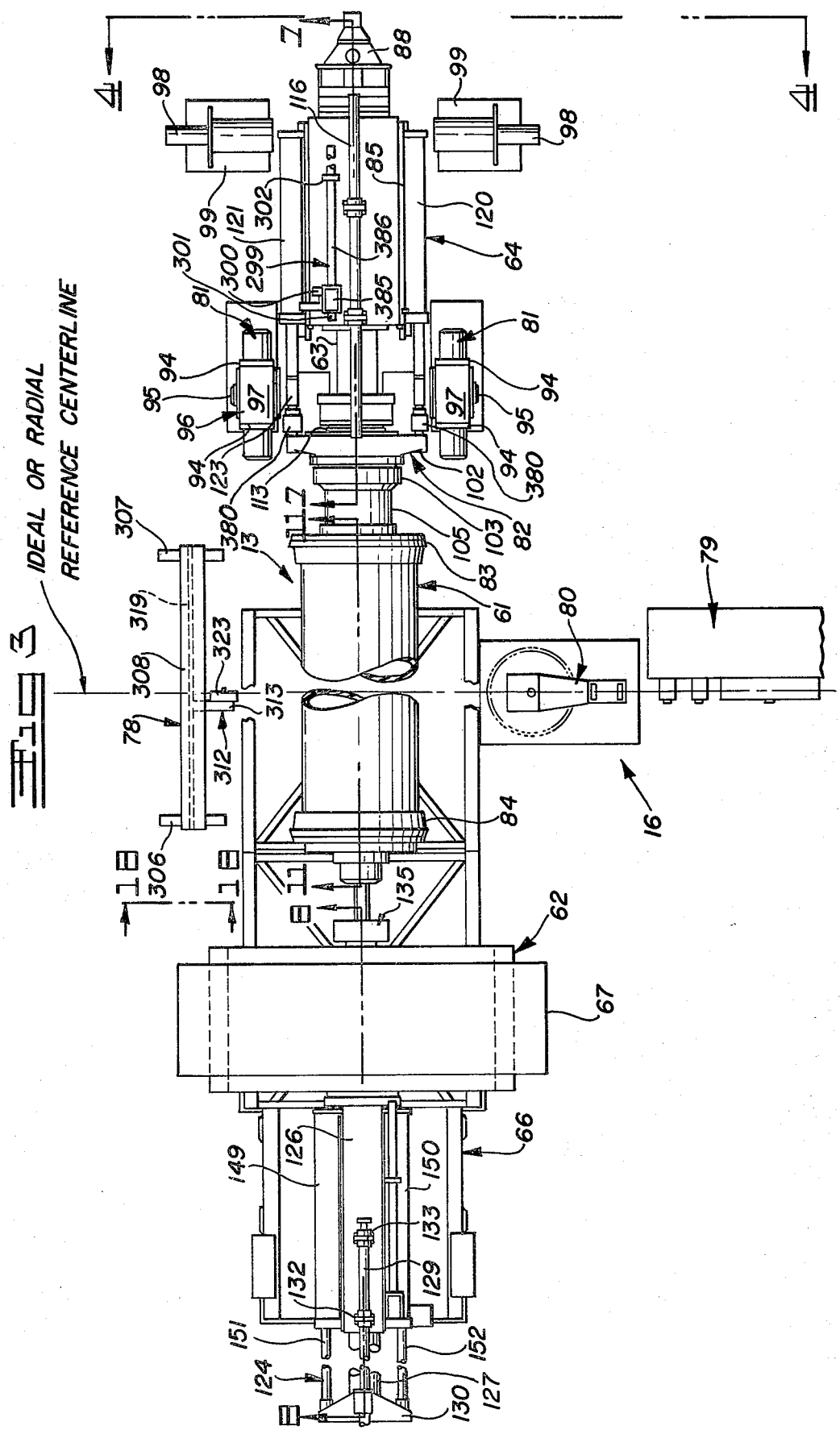

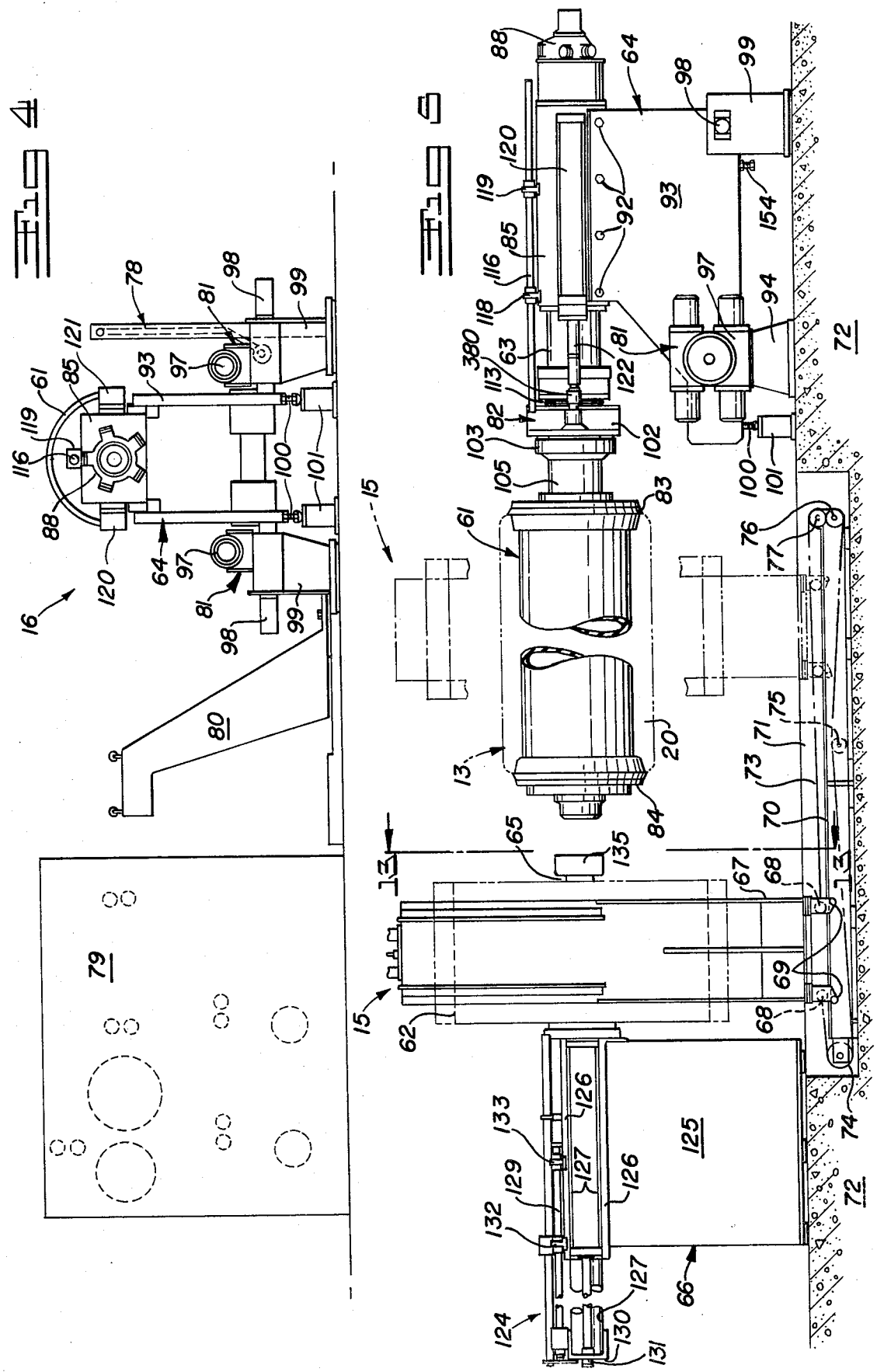

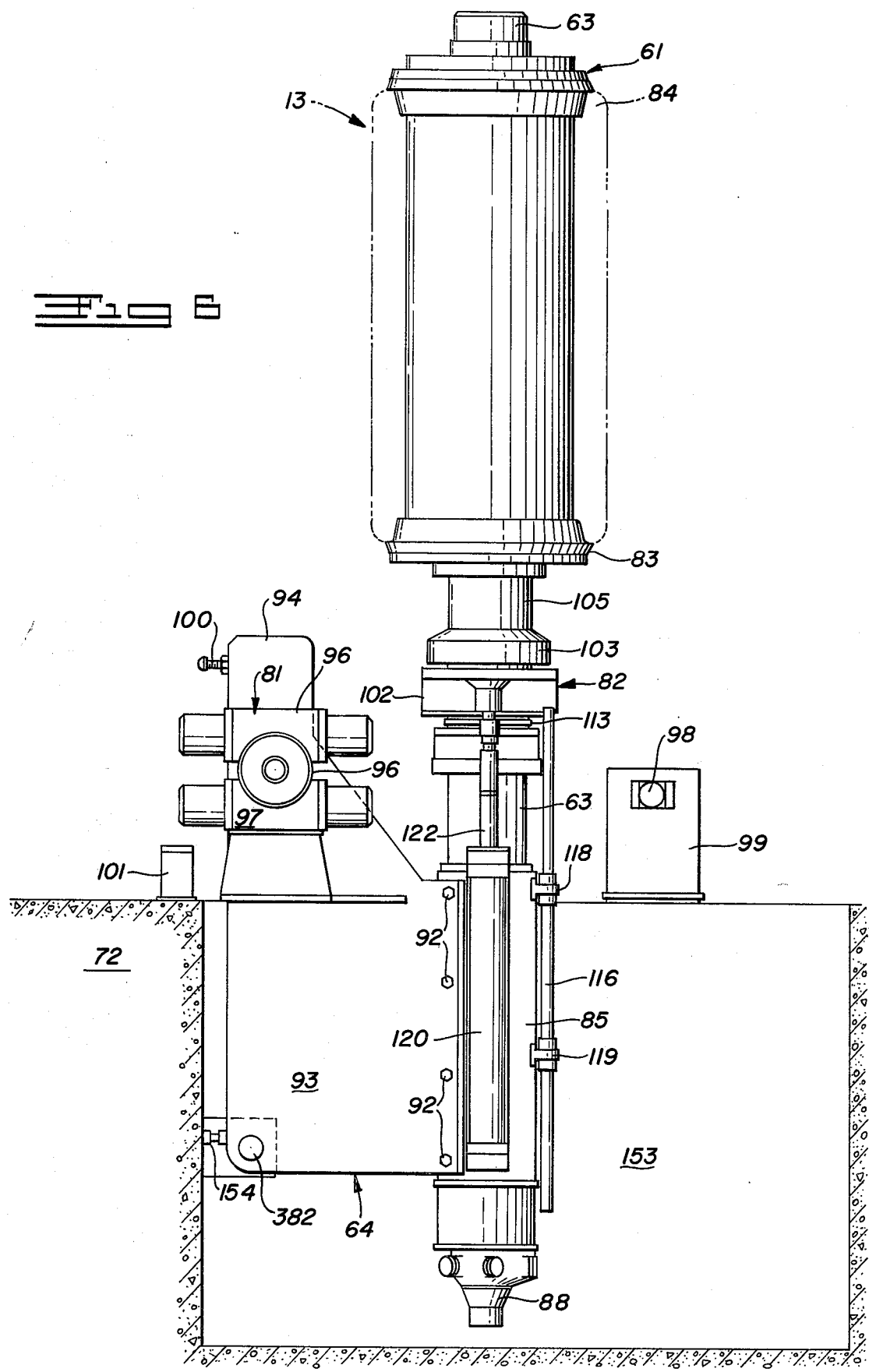

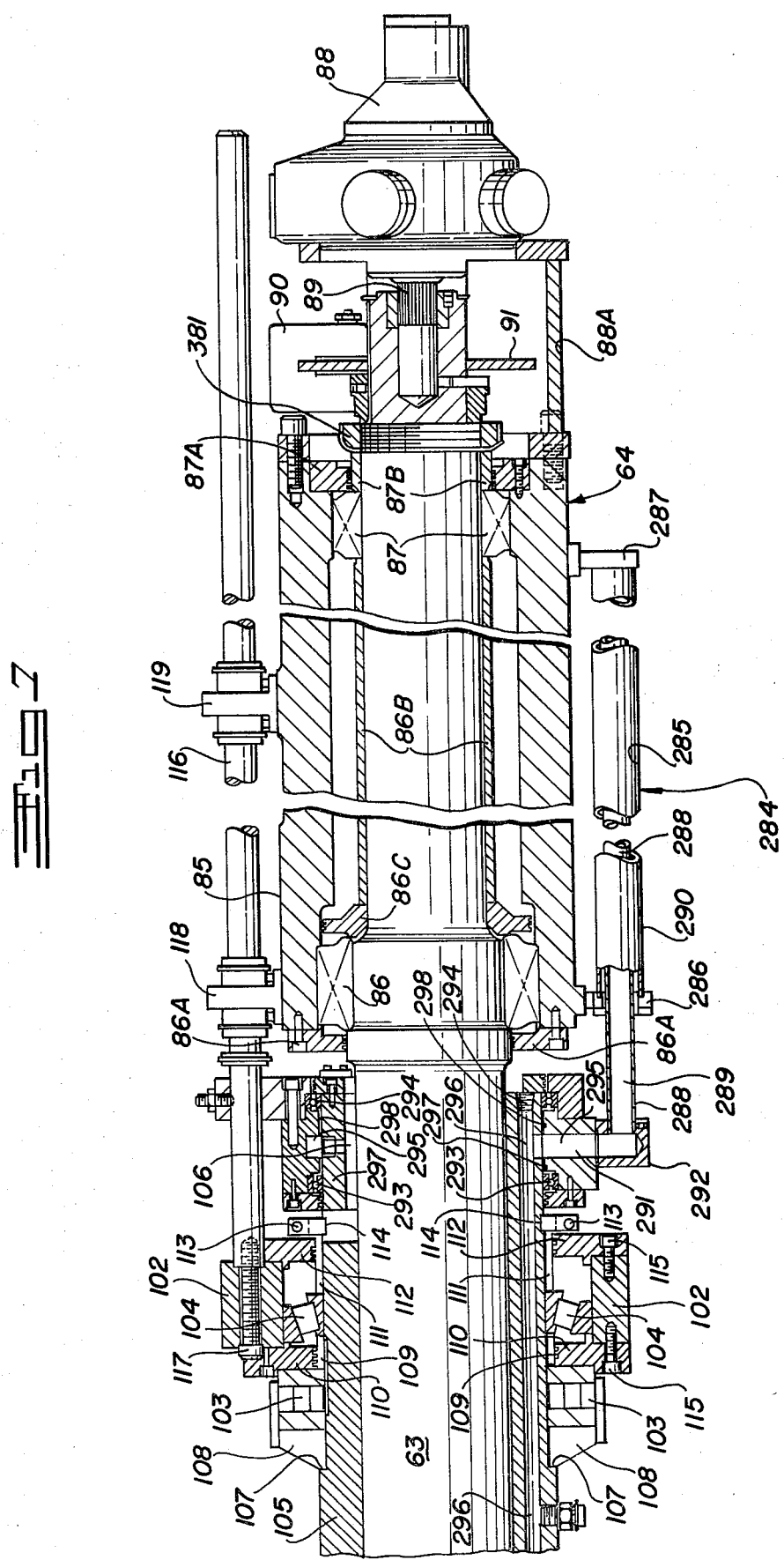

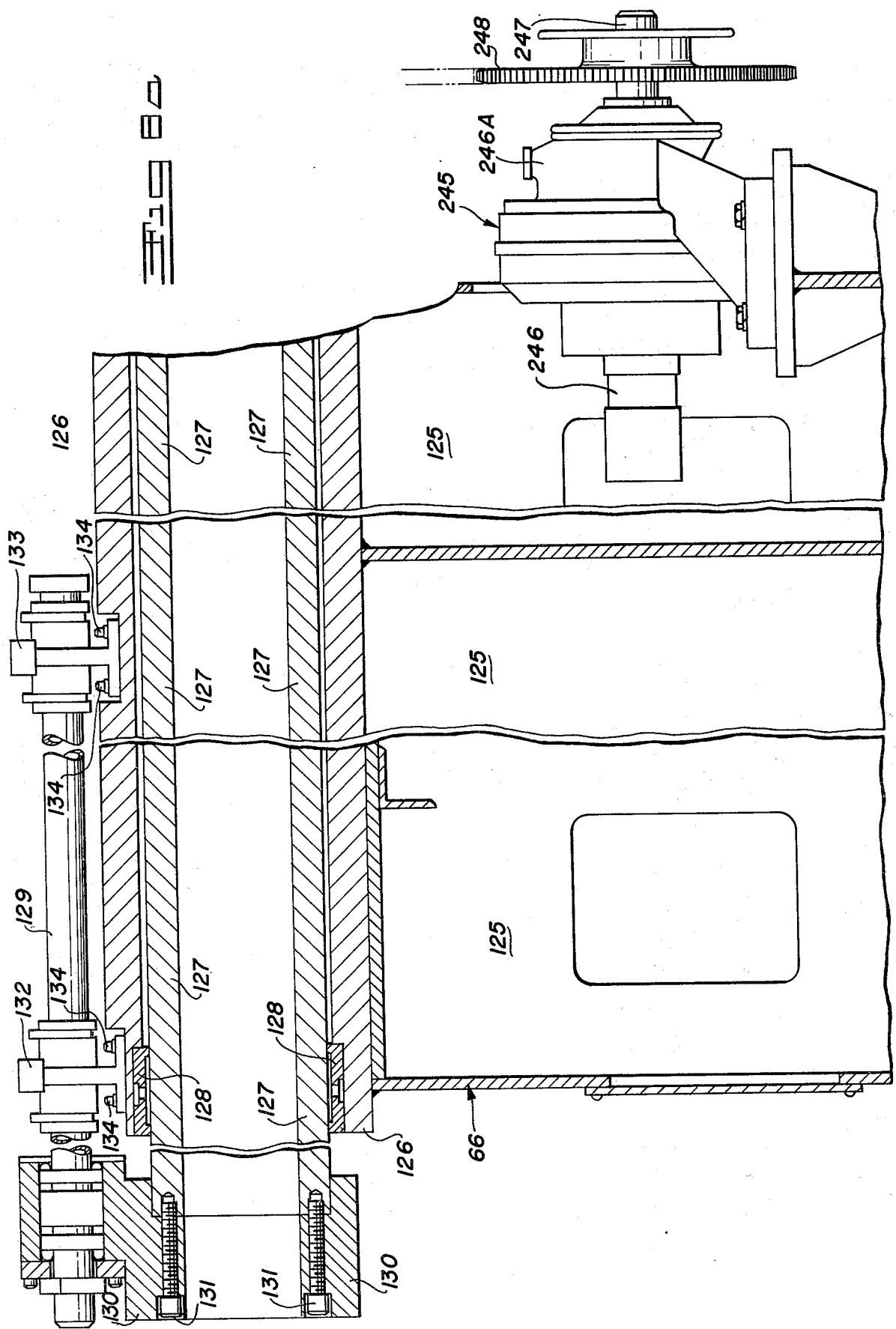

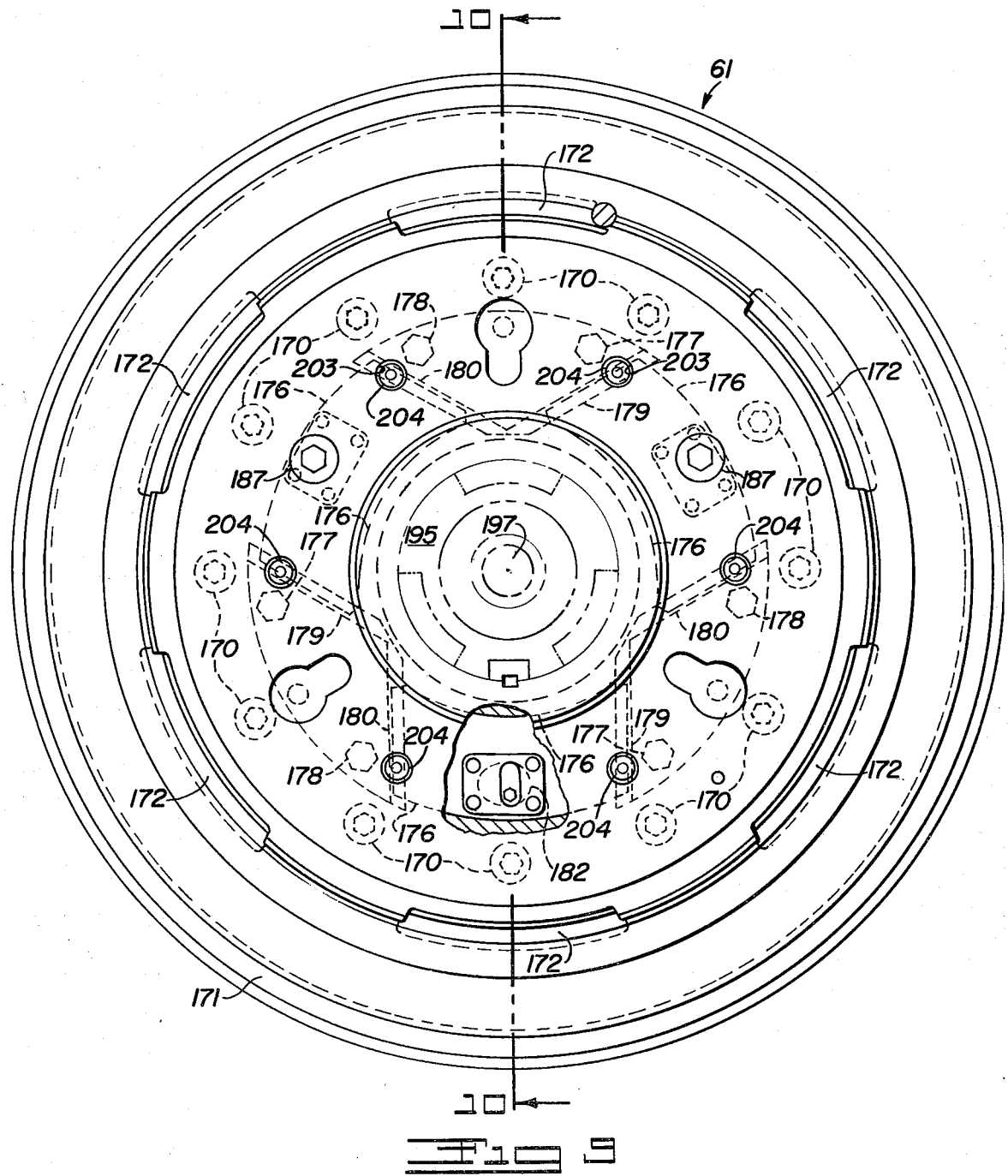

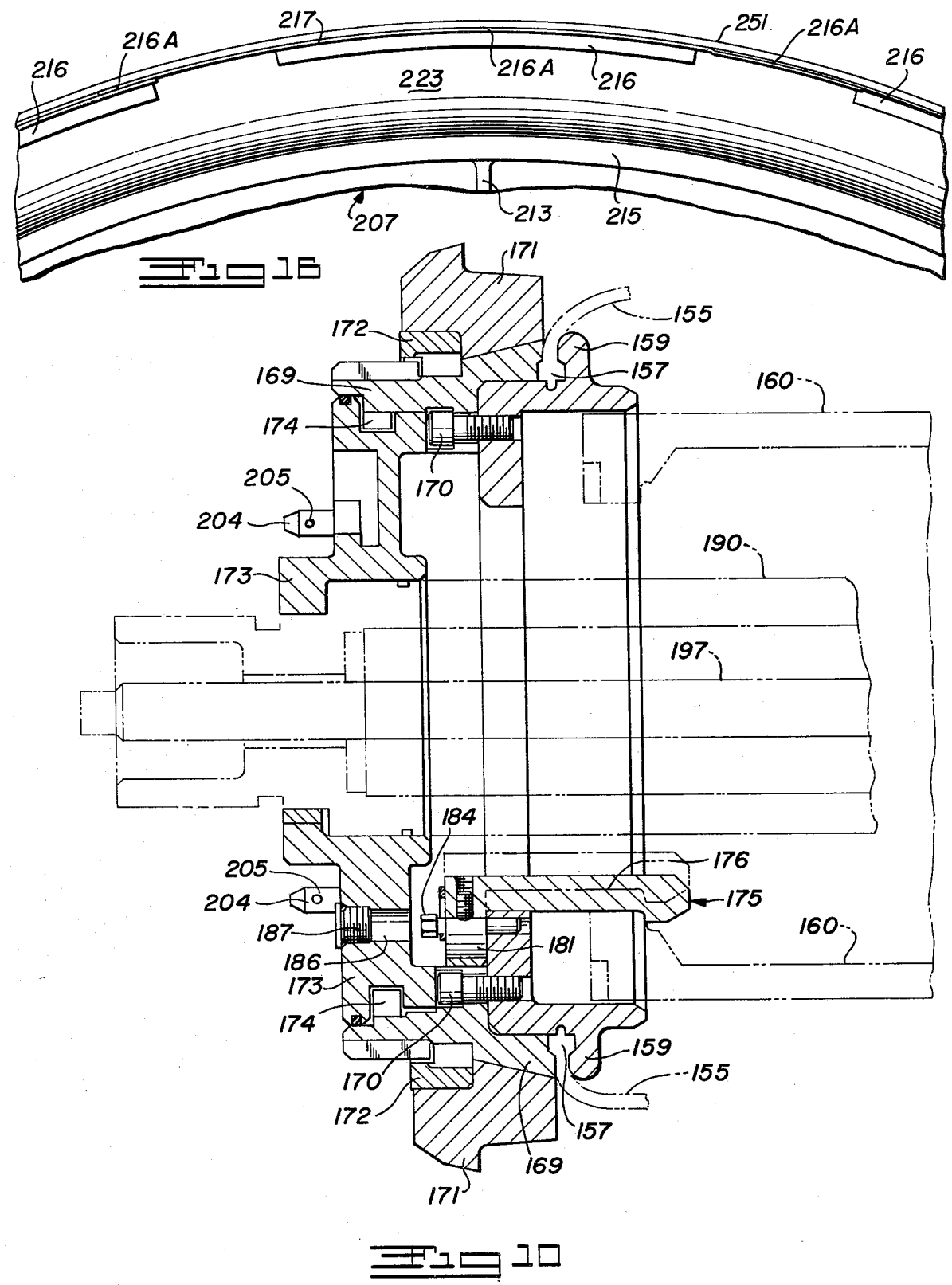

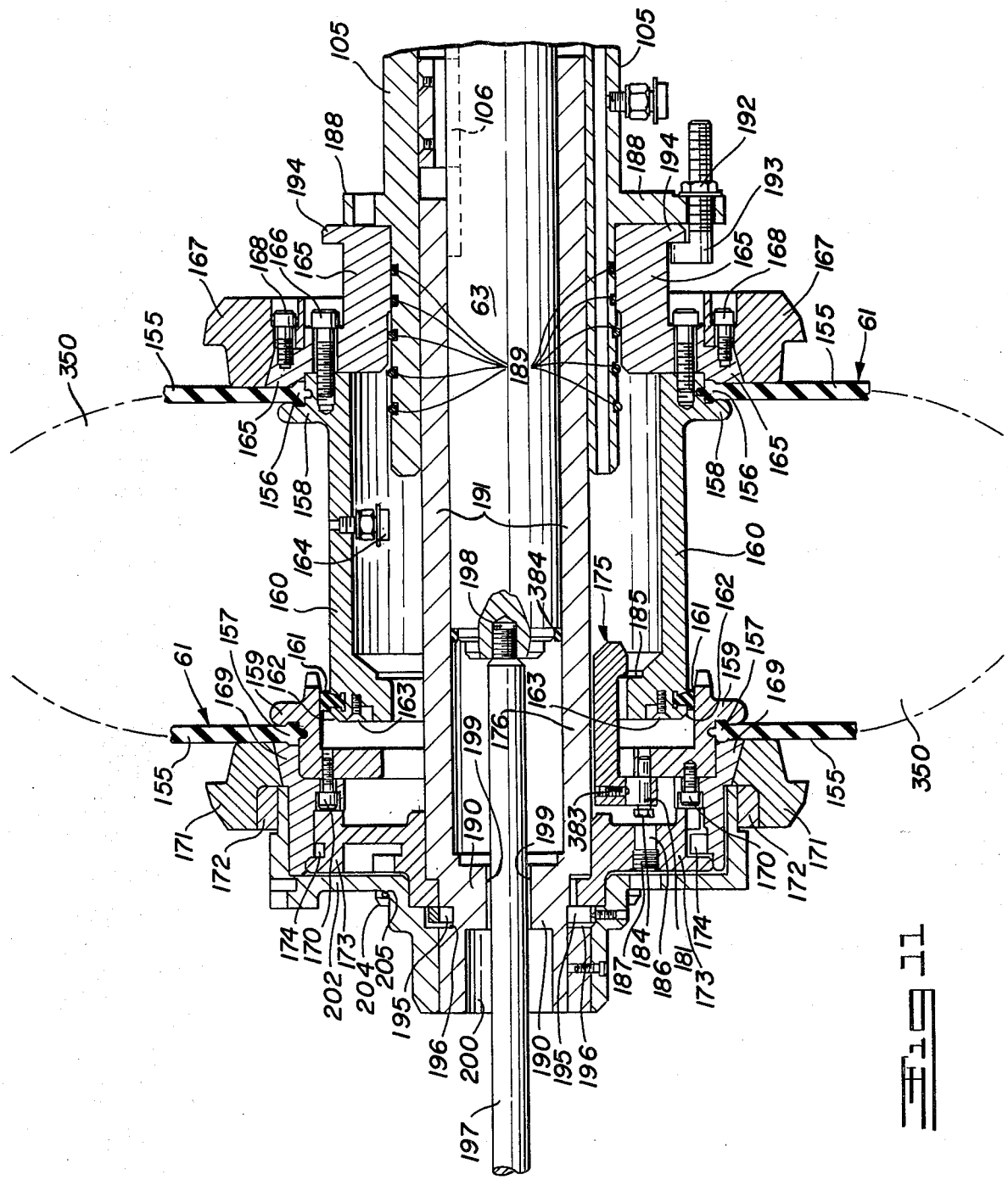

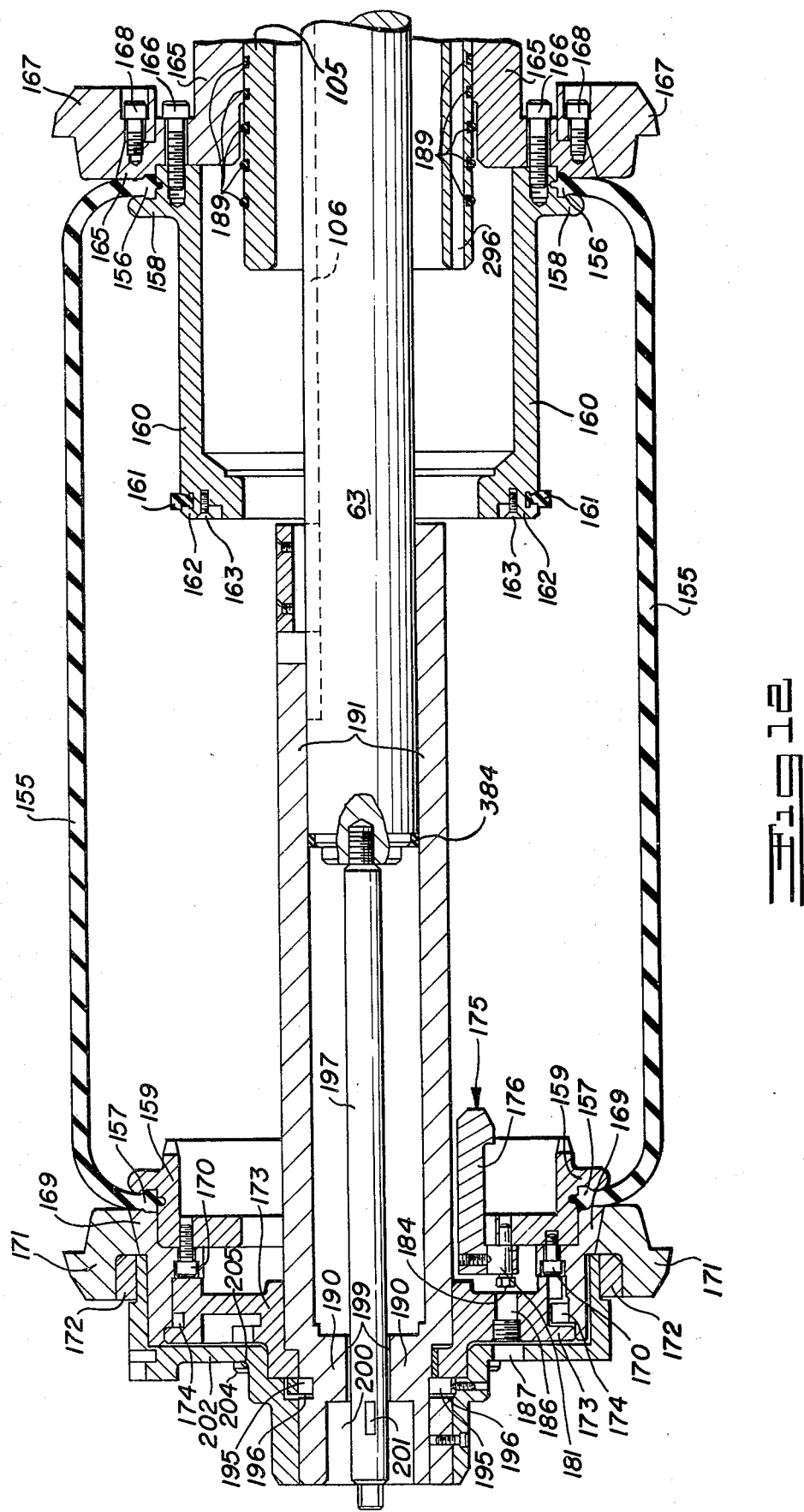

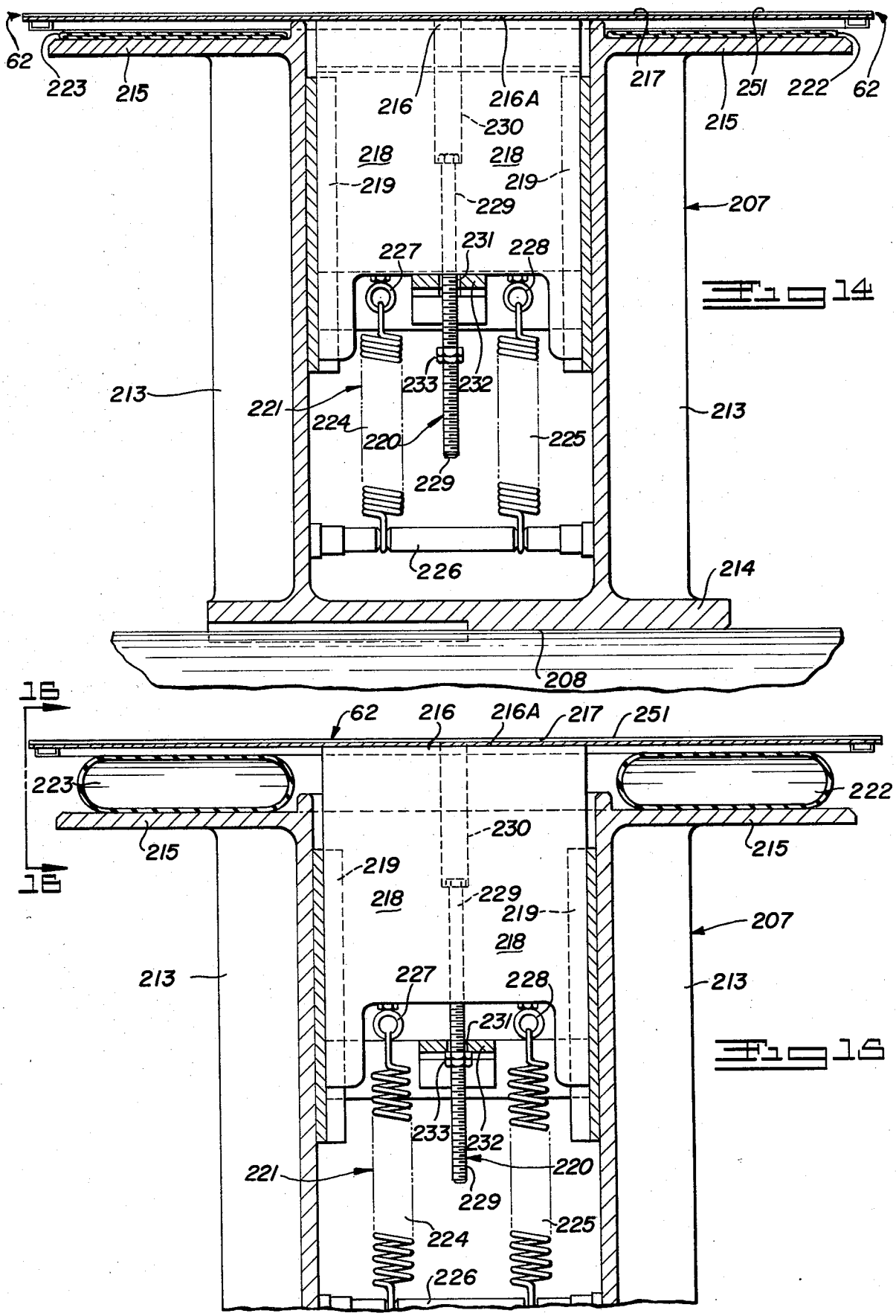

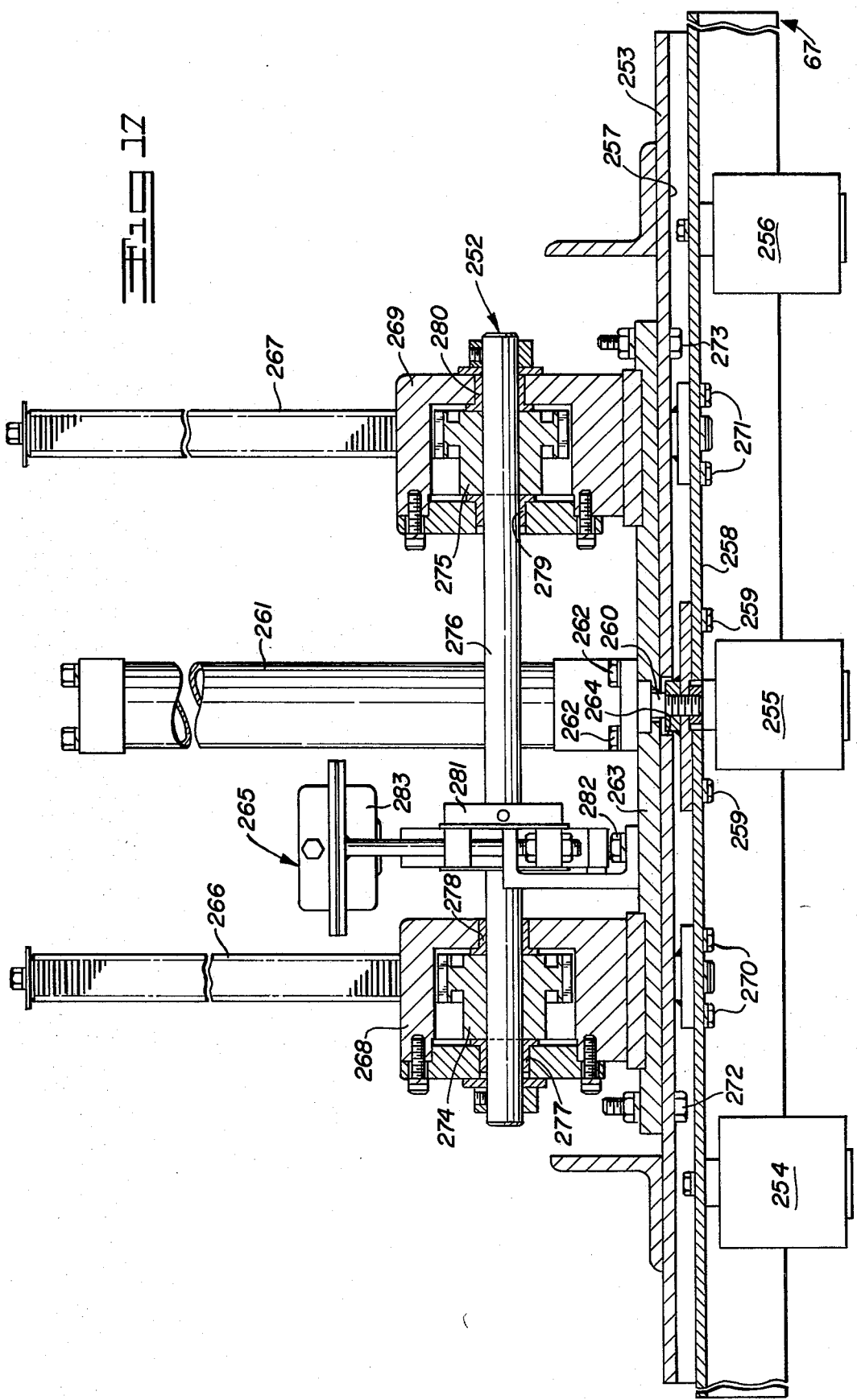

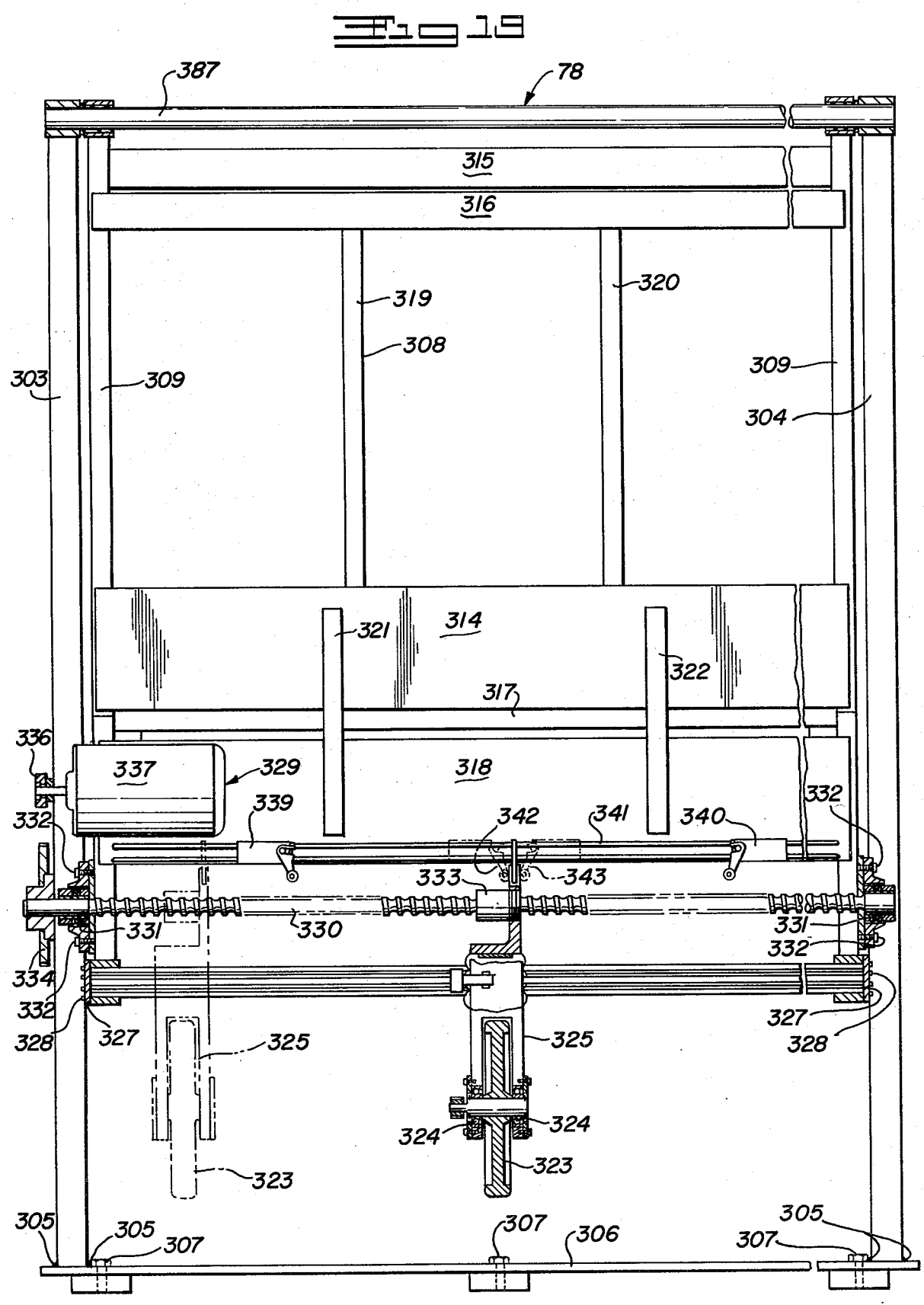

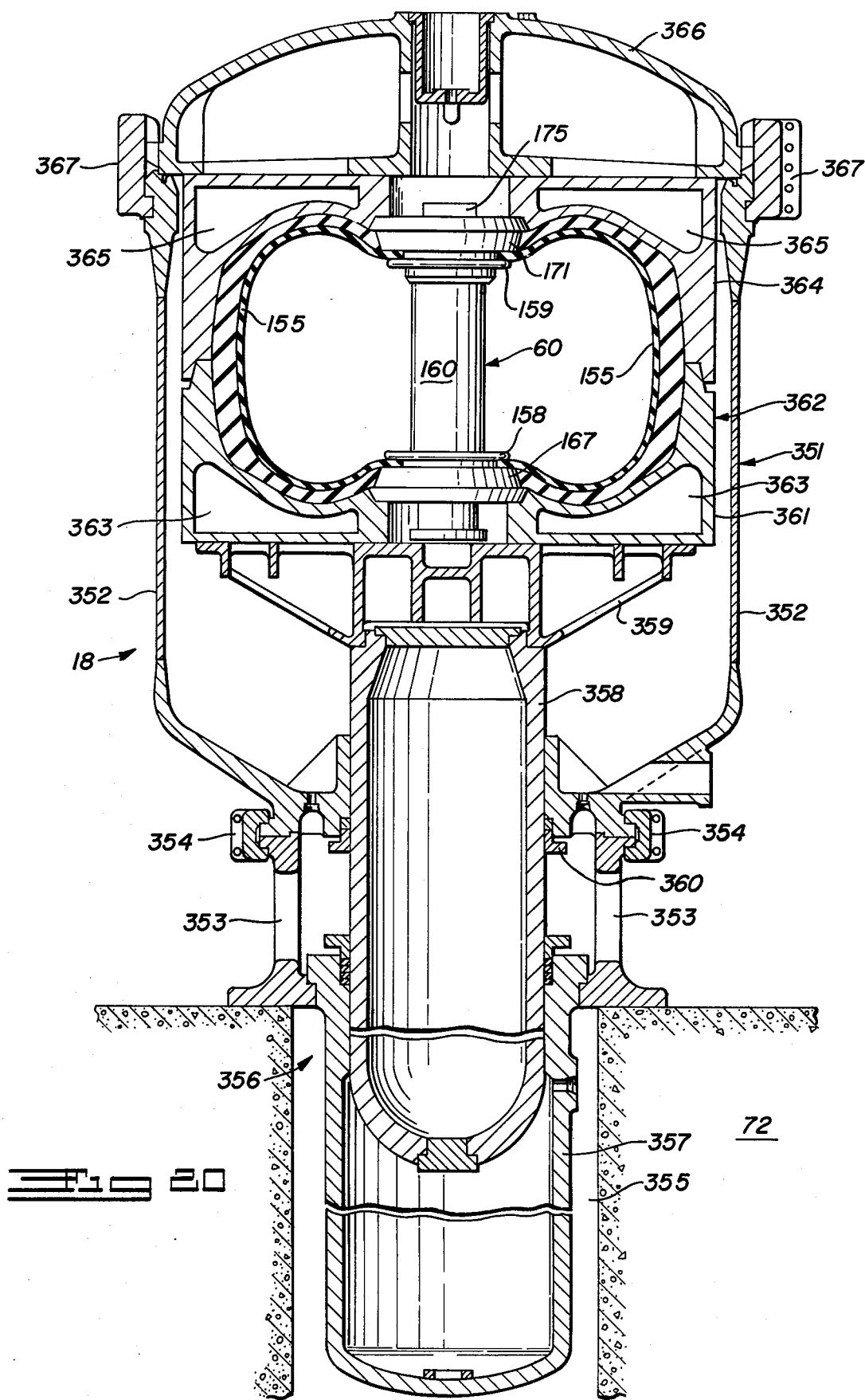

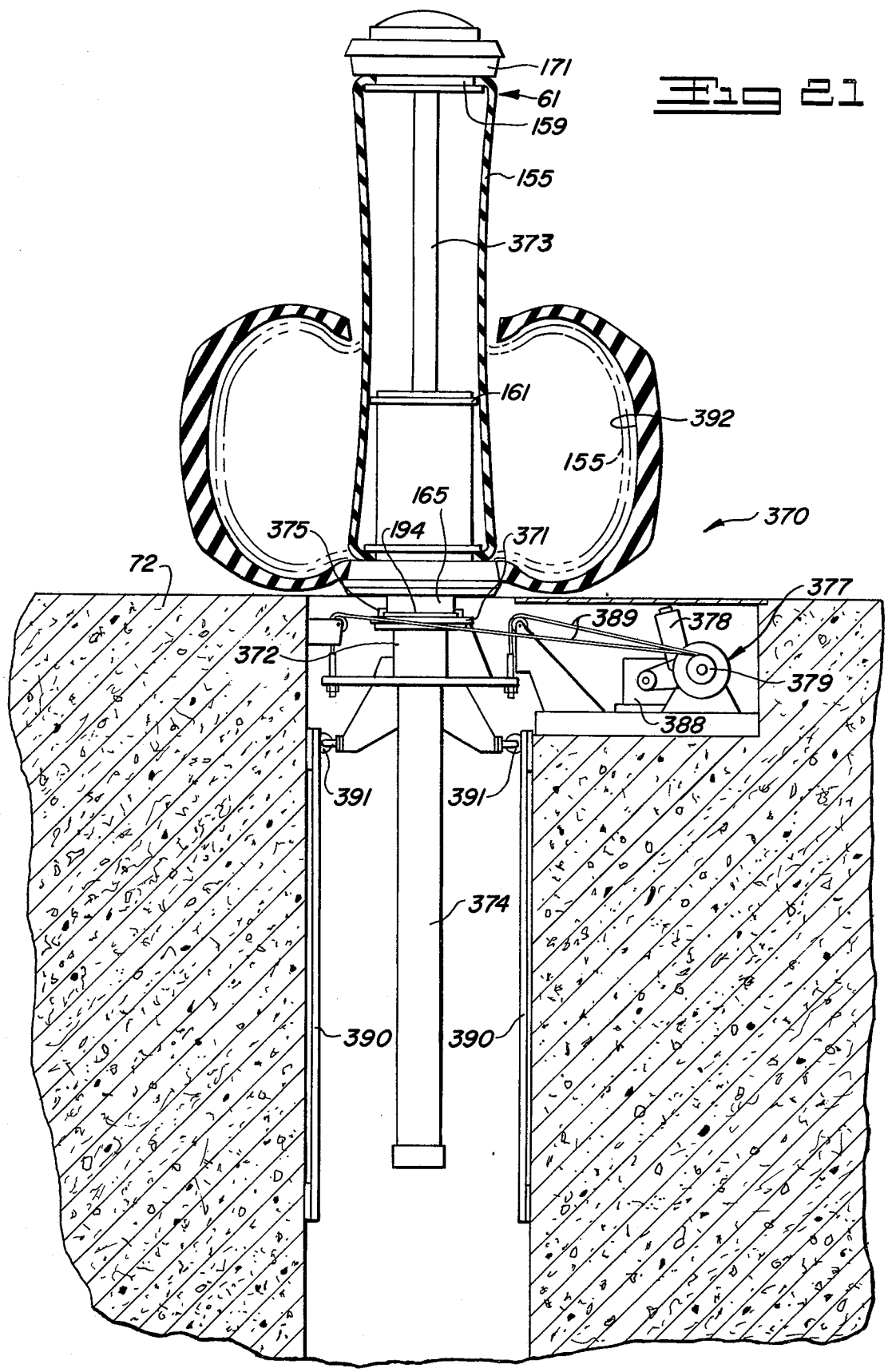

OFF-THE-HIGHWAY RADIAL TIRE BUILDING SYSTEM

FIELD OF THE INVENTION

The present invention relates to apparatus for making pneumatic tires and particularly off-the-highway radial ply pneumatic tires.

BACKGROUND

Pneumatic tires are typically comprised of carcass, tread and sidewall portions. The carcass portion has one or more layers of rubberized fabric or metal usually in a cord or cable form and is generally considered the foundation structure for the tire. The carcass portion usually terminates at and thus includes a pair of axially spaced annular bead portions stiffened by rigid and inextensible bead rings to secure and maintain the tire on a wheel and pneumatically seal the tire with the wheel. The tread portion is typically an elastomeric composition of suitable abrasion resistance and is integrated with the tire carcass along the crown thereof to provide the ground engaging surface for the tire. A breaker or belt assembly may be provided between the crown portion of the carcass and the tread and, depending upon the type of tire being built, may be initially assembled with either the carcass or the tread. The sidewall portions are typically of an elastomeric composition more flexible than the tread composition and join the bead portions to the tread.

Pneumatic tires are categorized as radial or bias type depending upon whether the direction of reinforcing cords in the carcass plies is radial or bias to the axial centerline of the tire. Tires of the bias type have been built by the "flat band" method utilizing equipment such as that described in U.S. Pat. Nos. 2,614,951, 2,614,952, 2,628,652, 3,171,769, 3,156,601, and 3,645,826, all of which are owned by the assignee of the present application. Tires of the radial ply type have been built by the "toric match" method using equipment such as that described in U.S. Pat. No. 3,475,254, which is also owned by the assignee of the present application.

The building techniques for building both radial and bias ply tires are similar in that principal portions or all of the tires are built on one or more expandable-collapsible cylindrical drums. After the building of the carcass, the tread-breaker assembly or the complete tire, the drum is collapsed and the tire component or finished tire removed typically by hand and transported to another station for further assembly or for cure. However, off-the-highway pneumatic tires for tractors, road graders, earthmovers and the like are too large and massive for simple manual transfer from and between building drums. Dismounting and transporting means such as that described in U.S. Pat. No. 3,787,262 can be used for these "giant" sizes.

A problem with such off-the-highway tires and particularly radial ply off-the-highway tires is that the tires do not have sufficient strength to support themselves in an uninflated and uncured or "green" state. Distortion under force of its own weight can severely degrade the quality of the tire produced. The tire cannot, therefore, be directly dismounted and transported by simply fastening the tire or tire carcass to, for example, an overhead crane. For this reason, the production of off-the-highway tires and particularly radial ply off-the-highway tires is extremely difficult, expensive and time consuming, and even then, the quality and quantity yields of the tires produced have not been completely satisfactory.

One method of producing off-the-highway bias ply tires has been to build the entire on one building drum. After the carcass is assembled, the tread is applied by strip treading procedures such as those described in U.S. Pat. Nos. 3,716,442, 3,177,918, 3,223,572, 3,251,722, 3,268,380 and 3,418,191. The assembled tire is then removed from the tire building machine by rotation of the axis of the building drum to a vertical position and removing the tire and drum together from the tire building machine (see, for example, U.S. Pat No. 3,787,262). The drum can then be conveniently removed from within the tire. It has been found, however, that such tires can become undesirably distorted by their own weight when placed in an axially vertical position. Such distortion may occur with massive tires of multiple plies in the carcass. With radial ply and/or wire tire constructions, the potential distortion is accentuated and more severe.

The present invention overcomes these difficulties and disadvantages of known tire building systems and apparatus. The present invention provides for the building, transporting and curing of giant off-the-highway pneumatic tires effecting improved qualitative and quantitative yield.

SUMMARY OF THE INVENTION

It is an object of the present invention to provide an improved system for the manufacture of giant off-the-highway radial type pneumatic tires.

It is a further object to provide a method and apparatus for fabricating giant off-the-highway radial type pneumatic tires in a more expeditious and efficient manner than heretofore known.

It is still a further object of the present invention to provide a fabricating system for off-the-highway radial type pneumatic tires, which system includes several stages involving transporting the giant tire to and from such stages wherein problems of transporting are minimized.

These and other objects which will become evident throughout the following description are achieved by a method and apparatus for making pneumatic tires and particularly off-the-highway pneumatic tires, wherein a tire carcass with bead portions is formed from rubberized plies around a tire carcass building drum preferably as described in copending application Ser. No. 472,314, now abandoned filed May 22, 1974, and assigned to the same assignee as the present invention in a first stage operation. The tire carcass is then preferably dismounted from the carcass building drum and transported to a second stage tire building machine preferably using a carcass transporter as described in copending application Ser. No. 472,270, filed May 22, 1974, now U.S. Pat. No. 3,909,335 and assigned to the same assignee as the present invention, thereby supporting the carcass against undesirable distortion and flexing under its own weight. Preferably, the inside surfaces of the carcass are lubricated preparatory to curing while maintaining the outer surfaces of the carcass substantially free of lubricant.

The second stage building operation includes a machine comprising a collapsible breaker building drum for building a breaker assembly and a detachable tire building drum for assembling the tire carcass built in the first stage and a breaker assembly and tire tread. A breaker transport mechanism, positioned about a circumferential transfer means, is provided for gripping the breaker assembly on the breaker building drum, and transferring the breaker assembly to the detachable building drum for mating with the tire carcass positioned thereon.

Preferably the detachable tire building drum is comprised of a shaping bladder, for shaping a tire carcass positioned thereover to a toric configuration. First and second bead rings, at least one of which is preferably readily removable, are also supported adjacent respective first and second bladder clamp rings for seating bead portions of a tire carcass positioned over the shaping bladder. In addition, lock means are provided for locking together the first and second bladder clamp rings with a tire carcass positioned over the shaping bladder in a toric configuration, and seal means are provided for sealing an internal volume defined by the shaping bladder and bladder clamp rings to maintain the shaping bladder in a toric configuration, when said bladder clamp rings are locked together in a contracted configuration.

The tire carcass is positioned on the detachable drum by first rotating the head stock to vertically position a first shaft. The detachable drum is then positioned onto the shaft by an overhead crane. A shaping bladder thereof is preferably thereafter stretched to a curvilinear cylindrical configuration, and the tire carcass is positioned over the stretched shaping bladder. The first shaft with detachable building drum and tire carcass thereon is then rotated to the horizontal position. The bead portions of the tire carcass are thereafter seated in bead rings of the detachable drum and the detachable building drum with the tire carcass is centered relative to a reference point on the tire building machine by individually and/or successively moving head stock and tail stock thrust means.

The shaping bladder of the detachable building drum is inflated and the shoulders of the building drum are concurrently extended toward each other by the head stock and tail stock thrust means to shape the tire carcass to the toric configuration and mate it with the breaker assembly. A stitching means is then extended preferably to contact the breaker assembly with a stitcher wheel and cause the stitcher wheel to travel over the breaker assembly in an overlapping helical path substantially along the direction of cords in outer plies of the breaker assembly. The lateral travel of the stitcher wheel is a function of the circumference of the breaker assembly at the vertical circumferential plane in which the stitcher wheel contacts the breaker assembly and the rotational speed of the breaker assembly. The rotational speed of the stitcher wheel depends on the circumference of portions of the breaker assembly contacting the stitcher wheel. The tread rubber is then applied preferably from a strip treader over the stitched carcass and breaker assembly to complete the tire assembly.

Locking and sealing means are provided on the detachable building drum to lock the detachable drum in a contacted position with an inflated volume sealed within the drum. Thus, the shaping bladder with the assembled tire thereover is maintained in an inflated toric configuration so that the tire can be dismounted from the tire building machine without the tire destructively distorting and flexing under its own weight. The first shaft with the detachable building drum and the assembled tire thereon is rotated to the vertical position for dismounting.

The detachable building drum with the assembled tire thereon in an inflated toric configuration is then dismounted from the second stage tire building machine. The outer exposed surfaces of the assembled tire are then lubricated. Thereafter, the detachable building drum with the assembled tire thereon is positioned in a curing means, and the tire is cured while maintaining the tire in its inflated toric configuration. The cured tire is then stripped from the detachable tire building drum.

Other details, objects and advantages of the invention will become apparent as the following description of the presently preferred embodiments and presently preferred methods for practicing the same proceeds.

BRIEF DESCRIPTION OF THE DRAWINGS

In the accompanying drawings, the preferred embodiments of the invention and the currently preferred methods of practicing the invention are illustrated, in which:

FIG. 2 is a side elevational view of a first stage tire building machine and a pneumatic tire transporter cage frame suitable for building and transporting a tire carcass in accordance with the present invention;

FIG. 3 is a top view of a second stage tire building machine suitable for assembling a breaker assembly, and applying the breaker assembly and a tire tread to a tire carcass in accordance with the present invention;

FIG. 4 is an end elevational view of the tire building machine taken along line 4—4 of FIG. 3;

FIG. 5 is a side elevational view of the second tire building machine shown in FIG. 3;

FIG. 6 is a side elevational view of the tire building machine shown in FIG. 3 showing a first tire building drum positioned vertically;

FIG. 7 is a partial cross-sectional view of the second tire building machine taken along line 7—7 of FIG. 3;

FIGS. 8 and 8a are partial cross-sectional views of the tire building machine taken along line 8—8 of FIG. 3;

FIG. 9 is an end elevational view of a detachable portion of a first tire building drum of the second building machine;

FIG. 10 is a partial cross-sectional view taken along line 10—10 of FIG. 9;

FIG. 12 is a cross-sectional view corresponding to FIG. 11 showing the detachable drum corresponding to FIG. 11 showing the detachable portion in extended position;

FIG. 14 is a partial cross-sectional view taken along line 14—14 of FIG. 13 showing a second tire building drum only;

FIG. 15 is a partial cross-sectional view corresponding to FIG. 14 showing the second building drum in expanded position;

FIG. 16 is a partial perspective view taken along line 16—16 of FIG. 15;

FIG. 17 is a partial cross-sectional view taken along line 17—17 of FIG. 13;

FIG. 19 is a perspective view, with portions cutaway, taken along line 19—19 of FIG. 18;

FIG. 20 is an elevational view in cross-section showing a curing apparatus utilized in the present invention; and FIG. 21 is an elevational view in cross-section of a stripping post utilized in the present invention.

DESCRIPTION OF THE PREFERRED EMBODIMENTS

Figure 1:
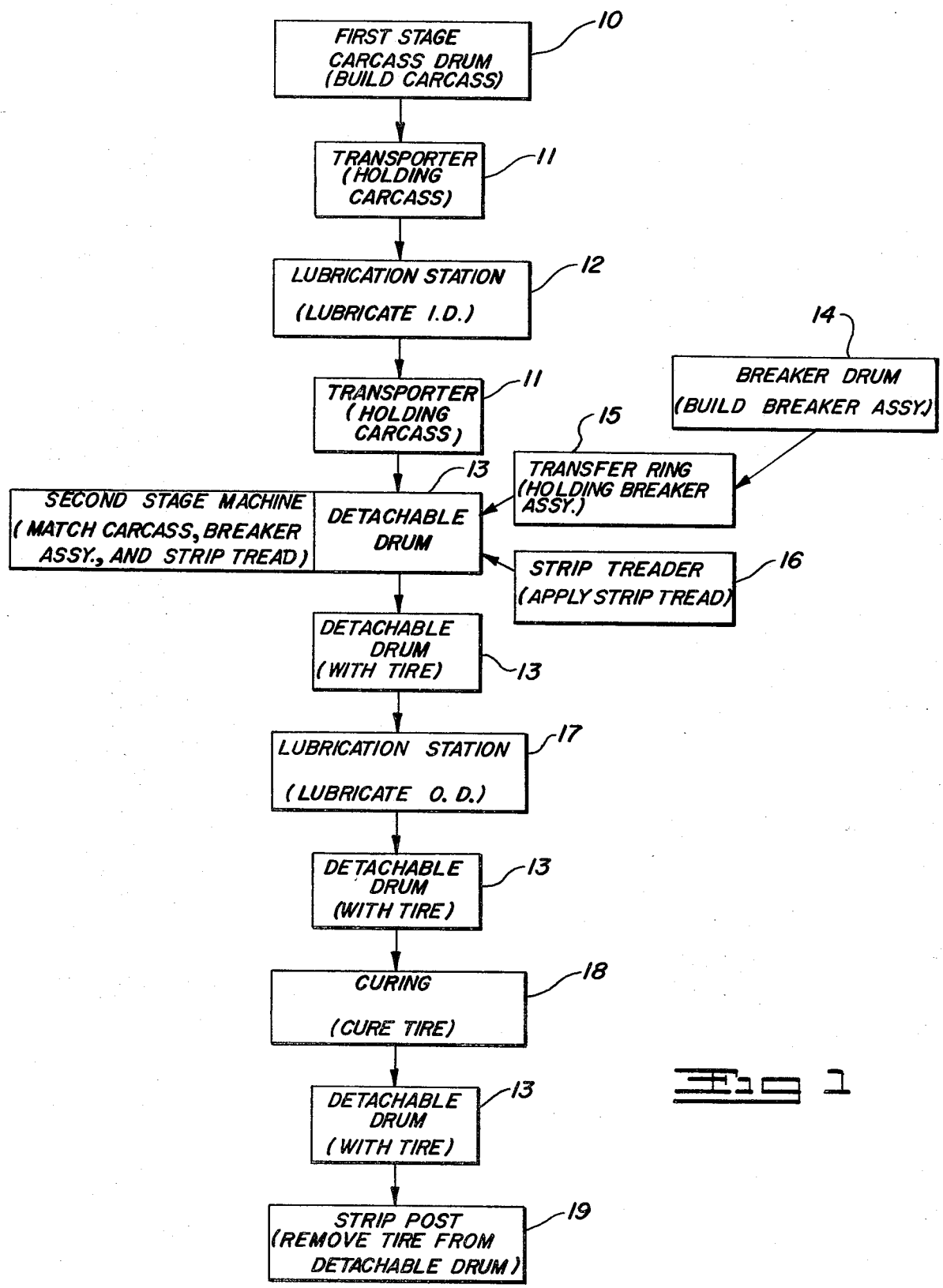
FIG. 1 is a block diagram illustrating the pneumatic tire building system of the present invention.

Referring to FIG. 1, a preferred method for building a pneumatic tire and particularly a radial-ply, off-the-highway pneumatic tire in accordance with the present invention is generally illustrated.

The tire carcass, including the bead portions thereof, is built on a first stage tire building machine having carcass building drum 10 preferably such as the one described in copending Ser. No. 472,314, filed May 22, 1974, and assigned to the same assignee as the present application. The carcass is built by wrapping plies of cord of impregnated rubber around the drum, seating beads, making turn-ups and stitching as more fully described hereinafter. The tire carcass is then dismounted from the first stage machine and transported by carcass transporter 11, preferably such as the one described in copending application Ser. No. 472,270, filed May 22, 1974, and assigned to the same assignee as the present invention, to a second stage tire building machine having detachable rotatable tire building drum 13. The tire carcass is positioned on the detachable tire building drum 13 via the carcass transporter 11.

During transport to the second stage tire building machine, the inside surfaces of the tire carcass are preferably lubricated at a lubrication station 12 in preparation for curing. The lubrication station may be any suitable means, including simply a man with a bucket and brush, that provides for lubrication of the inside surfaces of the tire carcass without lubricating the outside surfaces. The outside surfaces of the carcass must be maintained substantially lubricant-free so that good adhesion is provided for the breaker and tread rubber to the tire carcass during the subsequent building and curing operations. The lubrication of the inside surfaces of the carcass is preferably done prior to mounting the carcass on the detachable building drum 13 because preferably the building drum is detached and positioned in a curing means, and the tire cured without again exposing the inside surfaces of the carcass.

Meanwhile, a breaker assembly is built on a separate breaker building drum 14 positioned coaxially of detachable building drum 13. The breaker assembly is formed on breaker building drum 14 by wrapping plies with cord impregnated with rubber around the drum as more fully described hereinafter. Breaker transfer support means 15 is then positioned over the breaker drum to grip the assembled breaker assembly, and breaker drum 14 is collapsed so that the breaker assembly is supported solely by the transfer support means. The breaker assembly is then transported by transfer means 15 as hereafter described to symmetrically center the breaker assembly about the tire cacass on detachable building drum 13.

The tire carcass is then expanded to a substantially toric configuration and mated with the breaker assembly as hereinafter described. The transfer support means is then moved away and the breaker assembly is then stitched to the tire carcass preferably with a stitcher wheel that travels over the breaker assembly in a direction substantially along the direction of the cords in outer plies of the breaker assembly. This is accomplished by independently driving the stitcher wheel in a lateral direction, and moving the stitcher wheel from a first intermediate starting point near the center of the breaker assembly to the edge of the assembly at the tire shoulder, while the tire carcass is rotated in a direction corresponding to the bias of the cords in the outer plies of the breaker assembly, and then moving the stitcher wheel from a second intermediate starting point near the center of the breaker assembly across the first intermediate starting point to the other edge of the assembly, while the tire carcass is rotated in the other direction again corresponding to the bias of the cords in the outer plies of the breaker assembly. This method of stitching provides for smoother and more uniform mating of the breaker assembly to the tire carcass. Also, preferably the lateral rate of travel of the stitcher wheel over the breaker assembly is varied corresponding to the change in circumference of the portion of the breaker assembly contacted by the stitcher wheel and in correspondence to the rotational speed of the detachable tire building drum in order to provide the desired stitching overlap of the breaker assembly.

After stitching, tread rubber is applied to the stitched assembly preferably from strip treader 16, such as model 610 produced by AMF, positioned adjacent detachable building drum 13. The tread rubber is thus preferably applied in rubber strips over the breaker assembly and exposed carcass. Application of the rubber strips is preferably continued until the tire assembly is completed. Detachable building drum 13 is then locked and sealed as hereinafter more fully described with the tire in an inflated, toric configuration; and detachable drum 13, with the assembled tire thereon, is dismounted as a unit from the second stage tire building machine.

The outside surfaces of the completed tire are then lubricated at a second lubrication station 17, e.g. by spraying. Thereafter, the detachable building drum with the assembled tire thereon is positioned in a suitable curing mold in a curing means 18, such as a standard pot heater, and the tire is cured as hereinafter more fully described. After curing, the cured tire still mounted on the detachable building drum 13 is removed from the mold and positioned on stripping post 19. There the detachable building drum 13 is unlocked, unsealed and stripped from the completed tire. As an alternate method the detachable building drum 13 could be returned to the second stage machine for stripping.

FIRST STAGE TIRE BUILDING MACHINE

Describing the method with more particularity, reference is made to FIG. 2 as a starting point. First stage tire carcass building drum 10 has a substantially cylindrical outer surface, and inboard and outboard annular extensions having substantially cylindrical outer surfaces. The preferred carcass drum 10 is described by reference to U.S. Pat. No. 3,475,254, filed May 22, 1974, and assigned to the same assignee as the present application. Building drum 10 has annular extensions which are mounted in cantilever on a rotatable shaft, which is connected through a rotary seal hub and housing to a suitable power means (not shown). The surface of drum 10 is capable of expanding and contracting between two diameters preferably with positive control to stop at any diameter in between (see copending application Ser. No. 472,314, above referenced) and the surfaces of the annular extensions are composed of tubular inflatable turnover bladders (see U.S. Pat. No. 3,475,254, issued Oct. 28, 1969 to the same assignee as the present application).

The tire carcass is built on drum 10 by disposing rubberized plies typically symmetrically around drum 10. The plies are removed in a series of carcass plies from suitable servicing equipment (not shown) located adjacent drum 10, which equipment does not constitute a part of this invention, and wrapping the plies one at a time around the drum with the edge portions overlapping in substantially equal amounts onto the coaxially positioned annular extensions at each end of drum 10. Each of the plies is composed of a plurality of closely spaced substantially parallel textile or metal cords coated with a suitable elastomer. For radial ply tires, the plies are applied to drum 10 with the cords in a direction substantially parallel to the axis of the drum. Preferably, for off-the-highway tires, the plies are also applied with the drum expanded to different diameter settings to provide for better quality tire carcass construction.

Typically, after application of the rubber plies, building drum 10 is expanded to the largest diameter for building that particular size carcass, with the extensions still unexpanded, to form shoulders at each end for forming bead portions of the tire. As an alternate the beads may be placed adjacent the drum and the drum expanded. Beads are placed upon inboard and outboard bead ring carriers in the usual manner, and the carriers moved axially inwardly over the annular extensions to accurately abut and seat the beads against the shoulders formed by expanding the diameter of drum 10. On seating of the bead rings, the carriers are moved axially outward, and the turnover bladders are inflated to turn-up the edges of the carcass plies overlying the annular extensions and fold them around the positioned bead rings. When the turnover bladders are fully inflated, the bead ring carriers are again moved inwardly toward each other and annular sleeves thereon push the turnover bladders over the bead rings and against the outer surface of plies on the drum. The bead ring carriers are then moved away from building drum 10 and the turnover bladders deflated. The folded edges of the plies are then mechanically stitched against the underlying portions of the plies by known stitching means to complete the bead portions of the carcass. The operation of making the bead portions of the carcass are more fully described by reference to U.S. Pat. No. 3,475,254, granted Oct. 28, 1969, to the same assignee as the present application. The assembly of carcass 20 is then completed by applying other components such as sidewall assemblies and chafer strips to the assembled plies and bead portions of the carcass.

BREAKER TRANSPORTER

Still referring to FIG. 2, the breaker transporter comprises a transport cage frame 21 that is positioned circumferentially about tire carcass 20 of preferably a giant off-the-highway tire carcass positioned about first stage tire building drum 10. Transport cage frame 21 includes bottom clamping ring 22 and top clamping ring 23, with reinforcing ring 24 spaced between rings 22 and 23. Rings 22, 23 and 24 are joined by adjustable telescoping members such as 25 and 26 preferably horizontally positioned and symmetrically spaced about building drum 10 with telescoping member 25 at the bottom of the transport cage frame.

Each adjustable telescoping member, such as 25 and 26, of transport cage frame 21 includes first outer tubular member 27 rigidly mounted to bottom clamping ring 22 and reinforcing ring 24, and second outer tubular member 28 rigidly mounted to top clamping ring 23. Each tubular member 27 and 28 is joined by inner adjusting tubular member 29 having opposite end portions slipped into outer tubular members 27 and 28. Each inner adjusting tubular member 29 also has holes 30 equally spaced therealong.

Transport cage frame 21 is assembled and adjusted to length, for reasons hereinafter described, by inserting cage pins into appropriate holes 30 in inner tubular members 29, and sliding inner tubular members 29 into first outer tubular members 27 until the cage pins engage the end portions of first tubular members 27. Cage pins are then inserted in appropriate holes 30 adjacent end portions of outer tubular members 28, and top clamping ring 23 is positioned by sliding second outer tubular members 28 over inner tubular member 29 until the cage pins engage the end portions of second tubular members 28. Preferably, the assembly is performed for convenience with the transporter away from building drum 10 and the transport cage frame vertically positioned as hereinafter described.

A drive means (not shown) is then actuated to extend support pads inwardly to engage tire carcass 20 adjacent the bead portions thereof. First stage carcass building drum 10 is then collapsed, and the tire carcass is left supported by transport cage frame 21 to prevent it from distorting and flexing under its own weight. Because of the pressing and stretching action of the support pads, tire carcass 20 takes on the configuration as shown in FIG. 2. The construction and operative of the preferred transport cage frame is more fully described by reference to copending application Ser. No. 472,270, filed May 22, 1974, and assigned to the same assignee as the present application.

Transport cage frame 21 is supported by base plate 31 extending from and between clamping and reinforcing rings 22 and 24 on transport base 32. Transport base 32 is slidably mounted to move axially of tire building drum 10 by ball bushings 33, 34 and 35 on parallel, spaced apart rails 36. Ball bushings 33, 34 and 35 extend from main frame 37 to each rail 36 to support base 32. Main frame 37 in turn rotatably supports cage lift 38. Cage lift 38 includes a first rectangular tubular member 39 fastened to base plate 40. Base plates 40 are then pivotally mounted by pivot 41 from cradle mounts 42, which are mounted outwardly on either side of cage lift 38 and form a part of main frame 37.

Cage lift 38 also includes adjustable cage mount 43 comprised of second rectangular tubular member 44 which telescopes into first rectangular tubular member 39. Second tubular member 44 rides within first tubular member 39 by cam rollers 45 rotatably mounted on roller mounts 46 at the inserting end thereof, and cam rollers 47 mounted by cam yokes 48 at end portions of first rectangular member 39. Second tubular member 44 is also supported by cam roller 49 mounted in cam yoke 50 adjacent end portions of main frame 37.

Drive means 51 preferably is provided for rotating transport cage frame 21 from a horizontal to a substantially vertical position, where the central axis of cage frame 21 is substantially vertical. Drive means 51 includes worm screw jack 52 rigidly fastened by jack mounts 53 on main frame 37. Worn screw 54 of screw jack 52 is fastened by pivot shaft 55 at outer end portions thereof to base plates 40 of cage lift 38. Drive shaft 56 of screw jack 52 meshes with worm screw 54 and is driven through a suitable coupling and speed reducer by air motor 57 or the like. Air motor 57 and the associated speed reducer are mounted so that the entire assembly can move with the worm screw jack 52.

In operation, drive means 51 causes cage lift 38 of transport base 32 to rotate so that transport cage frame 21 has its axis substantially vertical as shown in chainline in FIG. 2. Air motor 57 has a large mechanical advantage by virtue of driving screw jack 54 so that tire carcass 20 generally of massive size positioned within cage frame 21 can be readily rotated from a horizontal to a vertical position. Further, the drive is positive so that cage frame 21 can be stopped and held without an external brake at any angular position between the horizontal and the vertical as desired, and it will readily lower cage frame 21 from the vertical to the horizontal position. Also, it should be noted in this connection that base plates 40 extend to support stop 58, which engages jack mounts 53 to provide support and stability for cage frame 21 when the cage frame is vertically positioned.

Still referring to FIG. 2, detachable assembly 59 is provided comprising top clamping ring 23 and the circumferential set of support pads slidably supported thereon. An overhead crane or the like can be thus used to transport tire carcass 11 by hooking the crane (not shown) to the top clamping ring 23 by an eye bolt and chain. The detachable assembly 59 is described in more detail by reference to copending application Ser. No. 472,270 above cited.

The overall operation of the transporter is initiated with the cage transporter frame 21 in horizontal position axially away from building drum 10. The transporter assembly is moved either manually or automatically axially along rails 36 on ball 33, 34 and 35 circumferentially about building drum 10 until clamping rings 22 and 23 are positioned symmetrically about the radial centerline of the building drum and adjacent the axial end portions of building drum 10. If necessary, adjustment to length is typically performed by telescoping members such as 25 and 26 and adjustable cage mount 43 before this movement is made, to provide for positioning of clamping rings 22 and 23 as desired. Positioning of adjustable pad 60 under top clamping ring 23 provides support for cage frame 21 so that sagging and binding of the cage frame with the building drum is avoided during dismounting.

A drive means described by reference to copending application Ser. No. 472,270, above cited, is then actuated, manually or automatically, to move support pads in the two circumferential sets radially inwardly to engage tire carcass 20 about opposite axial end portions of tire building drum 10. Building drum 10 is then collapsed leaving tire carcass 20 maintained in cage transport frame 21. Because the surfaces of support pads are angled radially inwardly toward the axial and radial centerlines of the building drum, tire carcass 20 is maintained under axial tension along its length and is not permitted to flex and distort under itw own weight.

The transport assembly with tire carcass 29 supported in cage frame 21 is then moved axially along rails 36 either manually or automatically, until the cage frame 21 clears the outboard end of the tire building machine as shown in FIG. 2. Drive means 51 is then actuated, manually or automatically, to rotate cage frame 21 and cage lift 38 so that the axial centerline of cage frame 21, as well as tire carcass 20 therein, is vertically positioned. An overhead crane (not shown) is then positioned over the carcass transporter and hooked to it by a chain to detachable transport assembly 59. The support pads around bottom clamping ring 22 are then disengaged from tire carcass 20, and the detachable transport assembly 59, with tire carcass 20 engaged therein, is transported away from the remainder of cage frame 21 to the second stage tire building machine where the breakers and tire tread are applied as hereinafter described. The tire carcass is held uniformly about its circumference at the uppermost axial end portion so that it does not distort or flex during transport. Preferably at some point or station during the transport to the second stage tire building machine, the carcass transporter is stopped and the inside surfaces of carcass 28 are lubricated, for example by brush, preparatory to curing, while maintaining the outside surfaces of the carcass substantially free of lubricant.

SECOND STAGE TIRE BUILDING MACHINE

Referring to FIGS. 3, 4 and 5, the overall second stage tire building machine assembly is shown. Shown in the figures are two building drums: detachable rotatable building drum 61 for breaker and tread assembly on the carcass and rotatable breaker building drum 62 for assembly of the breaker. Detachable building drum 61 is rotatably mounted in cantilever on first shaft 63 from head stock assembly 64; and breaker drum 62 is rotatably mounted in cantilever on second shaft 65 which extends from tail stock 66 coaxially with first shaft 63. Positioned for travel between and circumferentially about second building drum 61 and breaker drum 62 is breaker transfer support means 67 to transport a breaker assembly from breaker drum 62 to second building drum 61. Breaker transfer means 67 is preferably adapted to move by rolls 68 and 69 in a suitable track 70 in recess 71 on floor 72 utilizing a suitable chain drive 73 movable about sprockets 75, 75, 76 and 77. Positioned adjacent opposite sides of detachable building drum 61 are stitching mechanism 78 and strip treader 80 with strip tread feeder 79.

Describing the second stage tire building machine with more particularily, head stock 64 comprises (i) rotational means 81 for rotating head stock 64 to move first shaft 63 between a vertical and a horizontal position, and (ii) head stock thrust means 82 for moving inboard shoulder 83 of detachable building drum 61 axially along first shaft 63 toward and away from outboard shoulder 84.

Referring specifically to FIGS. 3 and 7 for detail, head stock 64 has housing 85 through which first shaft 63 is supported on tapered roller bearings 86 and 87 which are positioned on first shaft 63 by bearing spacers 86C, 86B, 87B and threaded collar 381 and in housing 85 by bearing retainer 86A. At the end of housing 85 is rigidly mounted by mount 88A high torque hydraulic motor 88 directly connected to first shaft 63 by spline connector 89. Adjacent motor 88 is disc brake 90 rigidly mounted on housing 85 with brake disc 91 rigidly mounted on first shaft 63 for positive, precision stopping and holding of the drive of building drum 61. Housing 85 is in turn mounted and supported by bolts 92 from side plates 93, which are in turn supported by shaft 95. Shaft 95 is supported on either end by rotary actuator units 97 which are mounted on base mounts 94.

Rotational means 81 comprises two base mounts 94 and two hydraulic rotary actuators 97 which are keyed to and support shaft 95 which is in turn keyed to and supports side plates 93. Rotary actuators 97 operate through an angle of 90° to rotate shaft 63 typically with detachable building drum 61 thereon, from the horizontal to vertical position with intermediate positive stopping if desired or from the vertical to horizontal position with intermediate positive stopping, if desired.

In the horizontal position, shot pins 98 are also provided on lock mounts 99 to rigidly support and maintain head stock 64. That is, shot pins 98 are actuated on horizontal positioning of head stock 64 to extend into corresponding openings in side plates 93. Also, adjustable stops 100 are provided on side plates 93 to contact base mounts 101 to ridigly support first shaft 63, with detachable building drum 61 thereon, in a horizontal position.

Head stock thrust means 82 is comprised of thrust collar 102 supported by tapered roller bearing 104 on bladder stretch sleeve 105, which is positioned on first shaft 63 adjacent the end of head stock 64. Stretch sleeve 105 is keyed at 106 to shaft 63 to rotate with shaft 63 yet be free to slide axially along shaft 63. Thrust bearing 103 and tapered roller bearing 104 are in turn rigidly positioned on sleeve 105 by shoulder 107 in the sleeve, thrust bearing back-up ring 108, spacer ring 109 and bearing retainer 110, spacer ring 111, and split ring 113 which seats in groove 114 in sleeve 105. Bearing retainer 110 and grease retainer ring 112 are fastened to opposite ends of thrust collar 102 by bolts 115. Thrust collar 102 is also supported from rotation by guide rod 116, preferably a Thomson shaft, fastened to thrust collar 102 by bolts 117 and slidably mounted in Thomson bearings 118 and 119, which are rigidly mounted to the top of housing 85.

Head stock thrust means 82 is powered to drive inboard shoulder 83 of detachable building drum 61 along first shaft 63 by hydraulic cylinders 120 and 121 (shown in FIGS. 3, 4 and 5). Cylinders 120 and 121 are rigidly mounted on opposite sides of housing 85, and have piston rods 122 and 123, respectively, having end portions fastened through self aligning thrust couplings 380 to thrust collar 102.

Similarly, tail stock 66 comprises tail shock thrust means 124 for moving outboard shoulder 84 of detachable building drum 61 axially along first shaft 63 toward inboard shoulder 83. Tail stock thrust means 124 in combination with head stock thrust means 82 provides a means for moving shoulders 83 and 84 of drum 61 toward and away from each other for the reasons hereinafter described.

Tail stock 66 comprises tail stock housing 125 having pilot support housing 126 mounted thereon. Slidably supported within support housing 126 is pilot tube 127 preferably on bronze bushings 128 and 128A (see FIG. 8). Pilot tube 127 is also slidably supported from rotation by guide rod 129, preferably a Thomson shaft, rigidly fastened to the outboard end of pilot tube 127 by pilot connector 130 and bolts 131. Guide rod 129 is slidably mounted in Thomson bearings 132 and 133, which are rigidly mounted on the top of pilot support housing 126 by bolts 134.

At the end of pilot tube 127 is rotatably mounted tail pilot assembly 135, which engages the end of detachable tire building drum 61 as hereinafter more fully described. Tail pilot assembly 135 comprises tail shaft 136 mounted in end portions of pilot tube 127 by tapered roller bearings 137 and 138 and thrust bearing 138, to provide for free rotation of the pilot spindle within pilot tube 127. Bearings 137 and 138 are rigidly positioned on tail shaft 136 by shoulder 140, bearing retainer 141, spacer ring 142, bearing retainer 143, bearing retainer 144, and threaded collar 145. Bearing retainer 146 is also fastened at the inboard end of pilot tube 127. Fastened over the end of tail shaft 136 is pilot spindle 147 by pins 148 press fitted in openings in end portions of pilot shaft 136.

Tail stock thrust means 124 in addition comprises hydraulic cylinders 149 and 150 rigidly fastened along opposite sides of pilot support housing 126. Cylinders 149 and 150 have piston rods 151 and 152, respectively, which are connected at their outboard ends to pilot connector 130 by suitable fastening means.

Referring specifically to FIG. 6, the second stage tire detachable building machine is prepared for reception of tire carcass 20 from the detachable assembly 59 of the carcass transporter, as above described, by first actuating rotational means 81 to vertically position first shaft 63. The rotation is accomplished by operating both hydraulic rotary actuators 97 to pivot head stock 64 about shaft 95 and permit head stock 64 to rotate into well 153 in floor 72. Adjustable stop 154 is provided on side plates 93 of head stock 64 to stop and steady first shaft 63 and head stock 64 in a vertical position. After head stock 64 is rotated into well 153 a shot pin 382 is actuated to engage with a hole in one side plate 93 to insure machine stability.

DETACHABLE BUILDING DRUM

Detachable building drum 61 and tire carcass 20 are then sequentially positioned on first shaft 63 as shown in FIG. 6. Drum 61 and its positioning on shaft 63, with the tire carcass, are specifically described by reference to FIGS. 9 through 12.

Figure 11:
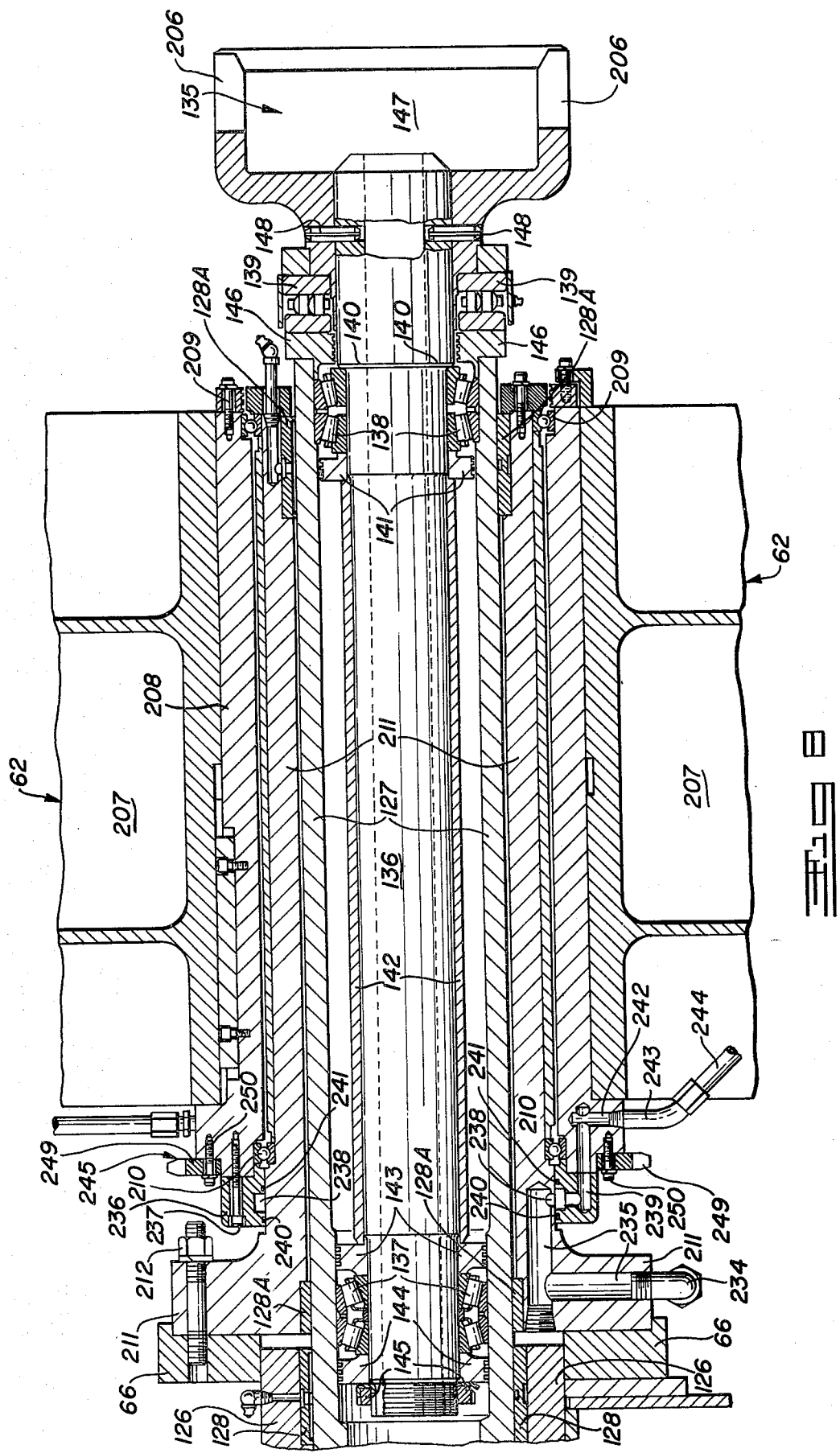
FIG. 11 is a partial cross-sectional view of the first tire building drum of the tire building machine taken along line 11—11 of FIG. 3.

Detachable building drum 61 is comprised of shaping bladder 155 having bead portions 156 and 157 seated in first bladder clamp ring 158 and second bladder clamp ring 159. Integral with first bladder clamp ring 158 is barrel 160 which contains seal 161 fastened circumferentially about the end portions thereof by seal seat ring 162 and screws 163. Seal 161, preferably of a suitable rubber or rubber fabric combination, forms a hermetical seal with second bladder clamp ring 159 when the drum 61 is locked as shown in FIG. 11 so that the tire carcass can be maintained in an inflated, toric configuration during dismounting of the finished tire from the second stage building machine as hereinafter described. Barrel 160 also has a quick air connector 164 so that further pressure can be provided to the inside of the tire during curing as hereinafter described.

Detachable drum 61 also includes first bladder seat ring 165 which is fastened to first bladder clamp ring 158 by bolts 166, and first bead ring 167 which is fastened to first bladder seat ring 165 by bolts 168. In addition, second bladder seat ring 169 is fastened to second bladder clamp ring 159 by bolts 170; and second bead ring 171 is fastened to second bladder seat ring 169 by keyways (not shown) and lock ring 172, which seats with ring 171 and makes a bayonet lock with second bladder seat ring 169. Detachable building drum 61 further includes pick-up ring 173 which forms a bayonet lock at cut-outs 174 with second bladder seat ring 169.

Lock means 175 is also provided for locking drum 61 in a contracted, sealed position with shaping bladder 155 in an inflated toric configuration. Lock means 175 consists of three locking segments 176 symmetrically positioned about second bladder clamp ring 159, each slidably fastened by bolts 177 and 178 in slots 179 and 180, respectively. Each locking segment 176 has eccentric 181 threaded to second bladder clamp ring 159 to move within eliptical opening 182 of locking segment 176. Eccentric 181 has integral hexagonal wrench head 184 to provide for rotating eccentric. By this arrangement, lock means 175 is unlocked by rotating the three eccentrics 181 to cause locking segments 176 to move radially inwardly along slots 179 and slots 180; and conversely, lock means 175 is locked by rotating the three eccentrics 181 to cause locking segments 176 to move radially outwardly to engage lip 185 around end portions of barrel 160. Spring plunger 383 matches with a detent on eccentric 181 when locking segment 176 is in the full inward position in order to prevent outward movement of the locking segment 176 from the centrifugal force of drum rotation. Corresponding openings 186 are provided in pick-up ring 173, and plugs 187 are provided in openings 186 so that lock means 175 can be operated without removing pick-up ring 173, while a suitable hermetic seal can be provided for maintaining shaping bladder 155 in the toric configuration as hereinafter described.

In use, detachable drum 61 is positioned on vertically positioned first shaft 63 in the form shown in FIG. 11, except that shaping bladder 155 is deflated and both drive ring 202 and bayonet lock ring 195 are left off. Drum 61 typically seats and rests on collar 188 of bladder stretch sleeve 105 and is hermetically sealed to sleeve 105 by O-ring seals 189 seated in grooves around sleeve 105 which engage a suitable shaped portion of first bladder seat ring 165. Alternatively, where head stock thrust means 82 is retracted sufficiently, drum 61 may rest on end portions 190 of outboard tube 191 which is first positioned over first shaft 63. Outboard tube 191 extends between and seats with bladder stretch sleeve 105 by virtue of necking of shaft 63 to a small diameter away from head stock 64 and provides a hermetic seal with seal 384 for inflation of shaping bladder 155, with tire carcass 20 thereon.

In any case, head stock thrust means 82 is extended to engage detachable drum 61 at first bladder seat ring 165; lock bolts 193 are turned until the lip of the bolt engages lip 194 of first bladder seat ring 165 and lock nuts 192 are tightened; and bayonet lock ring 195 is locked into cut-out grooves 196 in end portion 190 of outboard tube 191. Thus the inboard side of drum 61 is secured to head stock thrust means 82 and can be moved axially in either direction of thrust means 82. Bladder stretch rod 197 is then axially threaded into threaded opening 198 in end portions of first shaft 63 through opening 199 in end portions 190 of outboard tube 191; a spacer tube (not shown) is fitted over rod 197 to extend between seat 200 in outboard tube 191 and keyway 201 in end portions of rod 197; and a key (not shown) is inserted through keyway 201 to maintain the spacer tube in place.

Head stock thrust means 82 is then extended against the spacer tube to receive lock means 175. Plugs 187 are removed, and lock means 175 unlocking by turning eccentric 181 to slide locking segments 176 radially inward along slots 179 and 180. Thereafter, head stock thrust means 82 is retracted until seal 161 is separated from upper bladder clamp ring 159, the key removed from keyway 201, and the spacer tube removed from over bladder stretch rod 197.

Outboard end of detachable building drum 61 is then moved to the end of bladder stretch rod 197 to have keyway 201 coincident with a keyway through end portions 190 of outboard tube 191. This is accomplished by hoisting outboard end of drum 61 with an overhead crane (not shown). The building drum is fastened to bladder stretch rod 197 by extending a key through the coincident keyways of rod 197 and end portions 190 of outboard tube 191. Shaping bladder 155 is subsequently stretched to its full length as shown in FIG. 12 by retracting head stock thrust means 82.

Detachable building drum 61 is then prepared to receive the tire carcass 20 by removing bayonet lock ring 172 and upper bead ring 171. Tire carcass 20 is then positioned over and lowered onto detachable drum 61 still attached to detachable assembly 59 of the carcass transporter above described until bead portion of the carcass engage first bead ring 167, where the tire carcass is supported. The carcass transporter is removed and the second bead ring 171 and lock ring 172 are then replaced. The bladder 155 is also slightly inflated by means hereinafter described to support carcass 20.

The assembly is then prepared for subsequent tire building operations by first positioning drive ring 202 over the second upper assembly. Drive ring 202 has preferably six openings 203 symmetrically positioned therethrough that index the drive ring on corresponding pins 204 extending from pick-up ring 173. The drive ring locks the various components from turning by extending into the cut-outs of second bladder seat ring 169 and bayonet lock ring 172 and into the keyway of end portions 190 of outboard tube 191 and bayonet lock ring 195. Drive ring 202 thus stops the assembly from loosening by the rotational movement involved in the subsequent tire building operations. The drive ring is held in position by quick-snap pins 205 or the like that extend through openings in the ends of pins 204.

Rotational means 81 is then actuated to rotate first shaft 63 with detachable building drum 61 and tire carcass 20 thereon from the vertical to a horizontal position. The rotation is accomplished by operating both hydraulic rotary actuators 97 to pivot head stock 64 about shaft 95. When first shaft 63 reaches the horizontal position, shot pins 98 are actuated to rigidly support head stock 64, and first building drum 61 with tire carcass 20 thereon in cantilever from head stock 64.

Tail stock thrust means 124 is then actuated to extend pilot tube 127 until pilot spindle 147 of tail pilot 135 engages end portions of drive ring 202. Pilot spindle 147 has key clearance cutout 206 which is aligned with keyway 201 of bladder stretch rod 197 and the corresponding keyway of outboard tube 191. With engagement of tail stock thrust means 124 with the drive ring 202, the pressure is relieved on the key and the key is removed by pushing it through keyway 201, the keyway in the end portion 190 of tube 191, a key clearance (not shown) in drive ring 202, and key clearance cutout 206 in pilot spindle 147.

Thereafter carcass 20 is readied for further tire building by centering the carcass on shaping bladder 155. This operation is accomplished by first retracting head stock thrust means 82 until first bead ring 167 and second bead ring 171 are equal distances from the tire beads. Next the head stock thrust means 82 and tail stock thrust means 124 are extended simultaneously until the bead portions of carcass 20 are seated in first and second bead rings 167 and 171 adjacent to shoulders 83 and 84, respectively, of detachable building drum 61.

Preferably, shaping bladder 155 is also slowly inflated during extension of tail stock thrust means 124 and head stock thrust means 82 to keep the bladder even and also aid in centering the carcass1.

The carcass is now ready for assembly of the breaker assembly and the tire tread on the detachable building drum 61 at the second stage tire building machine.

BREAKER BUILDING DRUM

Meanwhile, the breaker assembly for the tire is assembled on breaker building drum 62. The construction and operation of the breaker building drum is described by reference to FIGS. 8, 8a and 13 through 16.

Breaker building drum 62 is comprised of a drum hub 207, preferably a casting of a suitable metal. The drum is mounted on a rotating shaft 208. Shaft 208 is supported by ball bearings 209 and 210 on hollow second shaft 211 rigidly mounted by bolts 212 in cantilever from tail stock 66 coaxial with first shaft 63, with pilot tube 127 and tail pilot assembly 135 extending through second shaft 211 as above described.

Drum hub 207 is comprised of a series of integral spokes 213 spaced symmetrically about tubular hub 214 and extending to an integral circumferential flange 215 extending around hub 207. Spokes 213 are preferably spaced axially apart in pairs and flanges 215 are preferably spaced axially apart, as shown in FIGS. 14 and 15, to provide support for other components of breaker building drum 62 as hereinafter described.

Positioned about drum hub 207 is a plurality of arcuate segments 216 an equal distance from the axial center of drum 62. Segments 216 are composed of relatively rigid, preferably metal elements which are relatively narrow in width compared to length, and which cooperatively define cylindrical surface 217 of building drum 207. Segments 216 preferably have attached metal plates 216A that overlap each other as shown in FIG. 16 so that a relatively smooth cylindrical surface 217 is provided on expansion and contraction of the drum diameter. Each arcuate segment 216 has a stem 218 that is adapted to slidably position in and between grooves 219 in spokes 213 as shown in FIGS. 14 and 15, and adjustable stop means 220 is provided to permit outward radial movement of each segment 216 to an outward adjustable limit.

Breaker drum 62 is expanded and collapsed between different diameters by inflatable bladders 222 and 223, and retraction means 221. Inflatable bladders 222 and 223 are symmetrically positioned circumferentially about drum hub 207 between flanges 215 of drum hub 207 and arcuate segments 216, and provide for uniform expansion of diameter of drum 62. Retraction means 221 is comprised of springs 224 and 225 positioned between shaft 226 which is rigidly fastened between each pair of spokes 213, and eyelets 227 and 228, respectively, which are fastened symmetrically to each stem 218 of each arcuate segment 216. Retraction means 221 provide for uniform collapse in diameter of drum 62.

Adjustable stop means 220 provides for adjustment of the largest diameter of breaker building drum 62 and comprises threaded bolt 229 extending radially through opening 230, and it is threaded through stem 218 of each segment 216 and through a clearance opening 231 in stop 232 extending rigidly between each pair of spokes 213. Nuts 233 are threaded in bolts 229 radially inboard of stops 232 so that arcuate segments 216 cannot expand beyond the location where nuts 233 engage stops 232. Thus, the largest diameter of drum 62 can be adjusted simply by uniformly turning bolts 229 inwardly or outwardly in the threaded portion of stem 218.

To prepare building drum 62 for building of a breaker assembly thereon, bladders 222 and 223 are inflated so that breaker building drum 62 is at the diameter corresponding to the desired inside diameter of the breaker assembly. Bladders 222 and 223 are inflated by supplying air under pressure from a suitable supply through conduit 234 (see FIG. 8) to passageway 235 in second shaft 211. The pressurized air is in turn passed through passageway 235 to rotoseal 236, which is fastened to shaft 208 by bolts 237. Rotoseal 236 is comprised of circumferential passageway 238, which corresponds with outlet passageway 235 in second shaft 211, and connecting passageway 239. Rotoseal 236 is hermetically and slidably sealed to second shaft 211 by two circumferential O-ring seals 240 and 241 on opposite sides of passageway 238. Passageway 239 in turn directs the pressurized air to and through passageway 242 in shaft 208 to connector 243 and conduit 244 supported on drum hub 207. Conduit 244 in turn directs the air to suitable stems (not shown) of inflatable bladders 222 and 223 which extend through flanges 215.

After inflation, building drum 62 is prepared for building of a breaker assembly thereon. Rotational drive of drum 62 is provided by drive means 245 shown in FIGS. 8 and 8a. Drive means 245 comprises a suitable motor 246 with integral gear reducer 246A mounted on tail stock 125 and connected by shaft 247 to sprocket 248. Corresponding sprocket 249 is mounted by bolts 250 circumferentially to end portions of shaft 208 axially about building drum 62, and sprockets 248 and 249 are linked by a drive chain (not shown).

The breaker assembly is built on detachable building drum 62 by disposing rubberized plies typically symmetrically around drum 62. The plies are removed in a series of breaker plies from suitable servicing equipment (not shown) located adjacent drum 62, which equipment does not constitute a part of the present invention, and wrapping the plies one at a time around drum 62 with singular revolutions of the drum with the edges of plies not extending beyond the edges of drum 62. Each of the plies is composed of a plurality of closely spaced, typically ferromagnetic metal wires, coated with a suitable elastomer such as natural rubber or butadiene-styrene synthetic rubber. Preferably for off-the-highway tires, the ends of the plies are biased at a low angle, e.g. 15° to 30°, to the circumferential centerline of the tire, and are applied alternately in opposite directions to the circumferential centerline to balance the load characteristics of the tire.

Preferably, the individual metal plates 216A of the breaker building drum 62 are adapted to facilitate assembly of breaker assemblies containing ferromagnetic metal reinforcing cords in the plies thereof by covering cylindrical surface 217 formed by plates 216A with a covering 251 of magnetic material. The magnetic material is typically an elastomeric material, such as natural or synthetic rubber, filled with a magnetic particulate material such as magnetized barium ferrite particles. The plies containing ferromagnetic reinforcing cords therethrough can therefore more readily be applied uniformly over cylindrical surface 217 of building drum 62. This aspect of the present invention is particularly useful in making giant off-the-highway tires because of the large size and weight of the plies that can easily curl or slip on the drum.

BREAKER TRANSFER SUPPORT MEANS

On completion of the breaker assembly, breaker transfer support means 67 is positioned circumferentially around and axially centered on breaker building drum 62 by drive means previously described. Gripping means 252 of breaker transfer means 67 is then actuated to grip the breaker assembly as hereinafter described, and breaker building drum 62 is collapsed to leave the breaker assembly supported in the transfer means 67. The structure and operation of breaker transfer means 67 is described specifically by reference to FIGS. 13 and 17.

Figure 13:
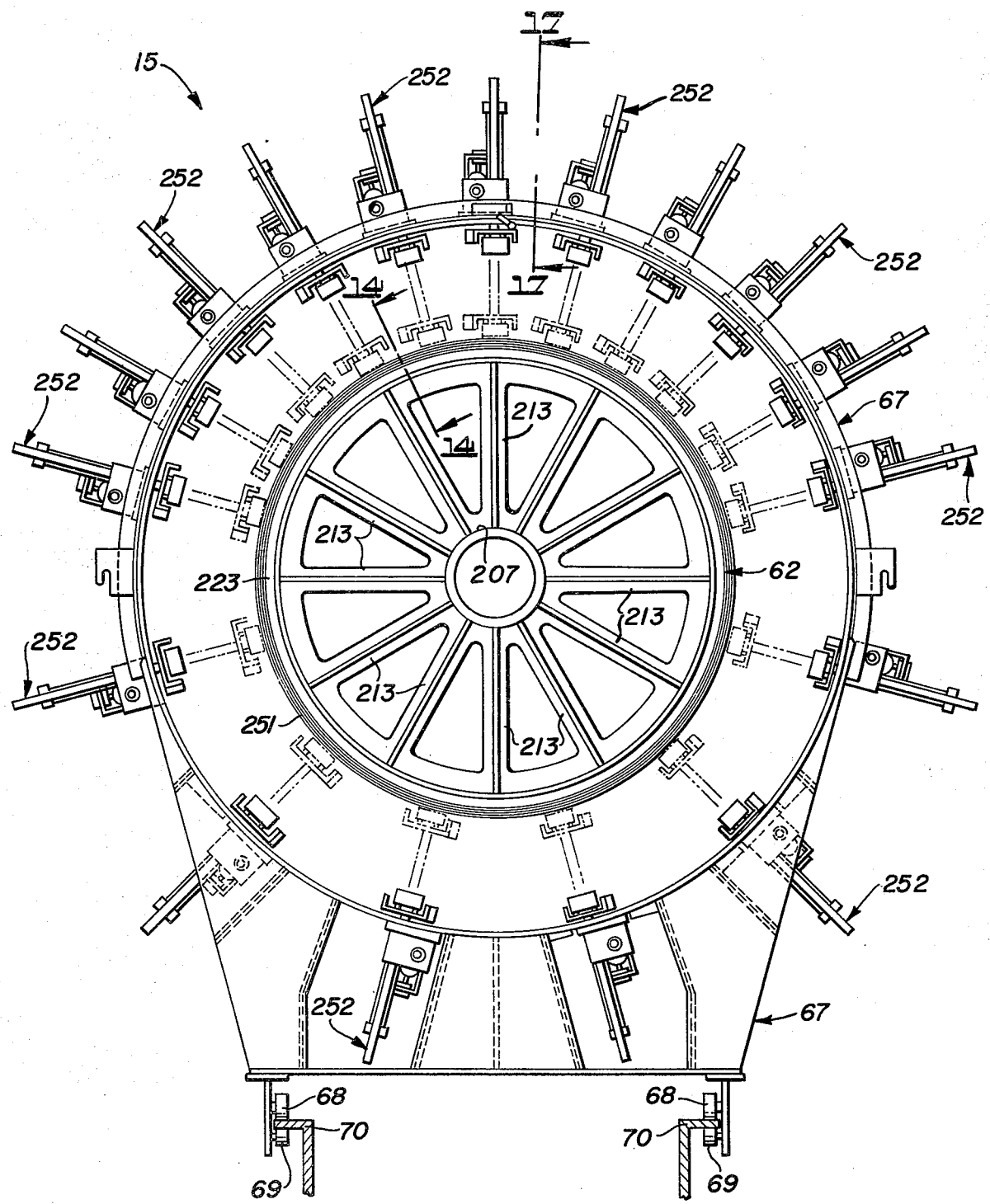
FIG. 13 is a partial perspective end elevational view of a second tire building drum and a transfer ring of the tire building machine taken along line 13—13 of FIG. 5.

Breaker transfer means 67 is comprised of transfer frame ring 253 around which a plurality of gripping means 252 are positioned. Gripping means 252 for gripping the breaker assembly are not symmetrically positioned around transfer ring 253 because more force is needed at the top to grip and support the breaker assembly in transfer mechanism 67. Gripping means 252 are preferably positioned at 15° intervals in the upper half of transfer ring 253 and at 30° intervals in the lower half of transfer ring 253 as shown in FIG. 13.

Each gripping means 252 is preferably comprised of three to five electromagnets such as 254, 255 and 256 spaced equidistant across inside surface 257 of transfer ring 253. Electromagnets 254, 255 and 256 are mounted on a common magnet mounting plate 258, which is in turn fastened by bolts 259 to piston rod 260 of air cylinder 261. Air cylinder 261 is in turn fastened radially about and to transfer ring 253 by bolts 262 and mounting plate 263 so that piston rod 260 can extend through opening 264 centered in mounting plate 263 and transfer ring 253.

Each gripping means 252 also has brake mechanism 265 that includes two racks 266 and 267 symmetrically positioned and spaced apart on either side of air cylinder 261. Racks 266 and 267 are supported on bushings (not shown) through rack-gear housings 268 and 269, respectively, so that racks 266 and 267 are slidable radially of the axial centerline of transfer ring 253. The end parts of racks 266 and 267 extend through suitable openings (not shown) in transfer ring 253 and are fastened to magnet mounting plate 258 by bolts 270 and 271, respectively. Rack-gear housings 268 and 269 are in turn positioned to mounting plate 263 by key locations as shown in FIG. 17, and mounting plate 263, with the entire assembly thereon, is fastened to transfer ring 253 by nut-bolt assemblies 272 and 273.

Brake mechanism 265 further includes spur gears 274 and 275 positioned in housings 268 and 269, respectively, to engage teeth of racks 266 and 267, respectively. Spur gears 274 and 275 are mounted on a common shaft 276 supported in housings 268 and 269 by flange bushings 277 and 278 and 279 and 280, respectively. Brake drum 281 is rigidly mounted to shaft 276. Stationary portion of diaphragm air brake 283 is attached to mounting plate 263 by bolt 282.

By this arrangement, the breaker assembly is gripped by actuating air cylinders 261 to extend electromagnets 254, 255 and 256 radially inwardly to contact the outer surface of the breaker assembly. Air brake 283 is then actuated to lock, the extension of racks 266 and 267, and electromagnets 254, 255 and 256 are energized to magnetically grip the breaker assembly by virtue of magnetic forces on the ferromagnetic wire cords therethrough.

Breaker building drum 62 is then collapsed by deflating bladders 222 and 223 to leave the breaker assembly supported by gripping means 252 within transfer frame ring 253. Breaker transfer support means 67 is then moved axially along by driving sprocket 74 and drive chain 73 until breaker transfer means 67 is centered circumferentially about tire carcass 20 on detachable building drum 61, as shown in chainline in FIG. 5.

MATE OF BREAKER ASSEMBLY WITH CARCASS

Tire carcass 20 is then mated with the breaker assembly by shaping the tire carcass to a substantially toric configuration. The shaping operation is accomplished by individual and simultaneous extensions of head stock thrust means 82 and tail stock thrust means 124 in coordination with the inflation of shaping bladder 155 of detachable building drum 61.

Inflation means 284 for inflating bladder 155 is best shown by FIGS. 7 and 12. Inflation means 284 comprises extension coupling 285 mounted by brackets 286 and 287 along housing 85 of head stock 64 to which pressurized air is supplied from a suitable source through suitable conduit (not shown). Extension coupling 285 has extension 288 with passageway 289 therethrough hermetically sealed with and slidably fastened to cylinder housing 290 so that the pressurized air is directed along passageway 289. End portions of passageway 289 communicate with passageway 291 or rotoseal 292.

Rotoseal 292 is mounted on end portions of bladder stretching sleeve 105 by ball bearings 293 and 294, and contains circumferential passageway 295 which communicates with and between passageway 291, and passageway 296 of sleeve 105. Rotoseal 292 also has O-ring seals 297 and 298 extending circumferentially about sleeve 105 on opposite sides of passageway 295 to form a hermetically sealed slip joint between rotoseal 292 and sleeve 105. Passageway 296 of bladder sleeve 105 extends into and axially along first shaft 63 to the hermetically sealed interior of building drum 61 (see FIG. 12). By this arrangement, air is directed from extension coupling 285 through rotoseal 292 and bladder stretch sleeve 105 to provide inflation means for the detachable second stage building drum 61.

As hereinafter described, it is important to the shaping operation that the positions of thrust means 82 and 124 and shoulder portions 83 and 84 be known with some precision. The position of head stock thrust means 82 is sensed by sensor means 299 (shown in FIG. 3) positioned along housing 85 of head stock 64. Sensor means 299 comprises potentiometer 300 rigidly fastened to housing 385 which is in turn rigidly fastened to housing 85 and rack 301 slidably engaging potentiometer gear inside housing 385. Rack 301 is slidably supported inside tube 386 which is in turn rigidly fastened to support 302 mounted on housing 85 and has the end thereof fastened to thrust collar 102 of head stock thrust means 82. On movement of thrust collar 102, rack 301 slides through housing 385 and rotates internal potentiometer gear (not shown) attached to potentiometer 300. Potentiometer 300 in turn records the movement so that the position of thrust collar 102 and inboard shoulder 83 of detachable second stage tire building drum 61 is known at all times. A similar sensor means (not shown) is positioned on tail stock 66 to sense the relative position of pilot connector 130 and in turn outboard shoulder 84 of building drum 61.

The shaping operation to form tire carcass 20 to the toric configuration and to mate it with the breaker assembly is done in essentially three stages: (1) centering detachable building drum 61 with the tire carcass thereon to an ideal or reference radial centerline relative to the second stage tire building machine; (2) inflating the carcass to a toric configuration slightly short of mating with the breaker assembly while still maintaining the centering of drum 61; and (3) inflating to match the tire carcass with the beaker assembly.

The centering of the detachable building drum 61, with tire carcass 20 thereon, is typically performed concurrently with or immediately after the seating of tire carcass 20 on building drum 61.

The seating of the bead portions of tire carcass 20 with first and second bead rings 167 and 171 has been previously described. The centering is performed by moving head stock thrust means 82 and tail stock thrust means 124 individually and simultaneously. The purpose of centering is to provide for precise assembly of the breaker and tread, and particularly to provide for application of the tread rubber as hereinafter described. Strip treader 80 and strip tread feeder 79 operate on the condition that the tire is positioned at a specific reference position relative to the machine and particularly detachable building drum 61.

The second stage of inflating carcass 20 to a toric configuration slightly short of mating with the breaker assembly is typically performed just prior to axial centering of breaker transfer mechanism 67 around detachable building drum 61. Positioning of the breaker assembly relative to carcass 20 is thereby facilitated. The toric shaping of carcass 20 is performed by simultaneous extension of head stock and tail stock thrust means 82 and 124 toward each other, and coordinated inflation of shaping bladder 155 through inflation means 284.

On completion of the second stage and positioning of breaker assembly with breaker transfer mechanism 67, the axial positioning of the breaker assembly relatively to tire carcass assembly is checked by measurement. This measurement is preferably performed by linear measuring between fixed reference points on the toric-shaped carcass and on the breaker assembly. The inflation and coordinated movement of thrust means 82 and 124 is then continued to mate the tire carcass with the breaker assembly.

Thereafter, gripping means 252 are de-energized and retracted. Specifically, electromagnets 254, 255 and 256 of each gripping means 252 of breaker transfer support means 67 is de-energized, and brake mechanism 265 of each gripping means 252 of the breaker transfer means is released. Breaker transfer support means 67 is then moved away from second stage building drum 61 to leave the breaker assembly supported around the tire carcass.

STITCHING OF BREAKER ASSEMBLY TO CARCASS

Figure 18:
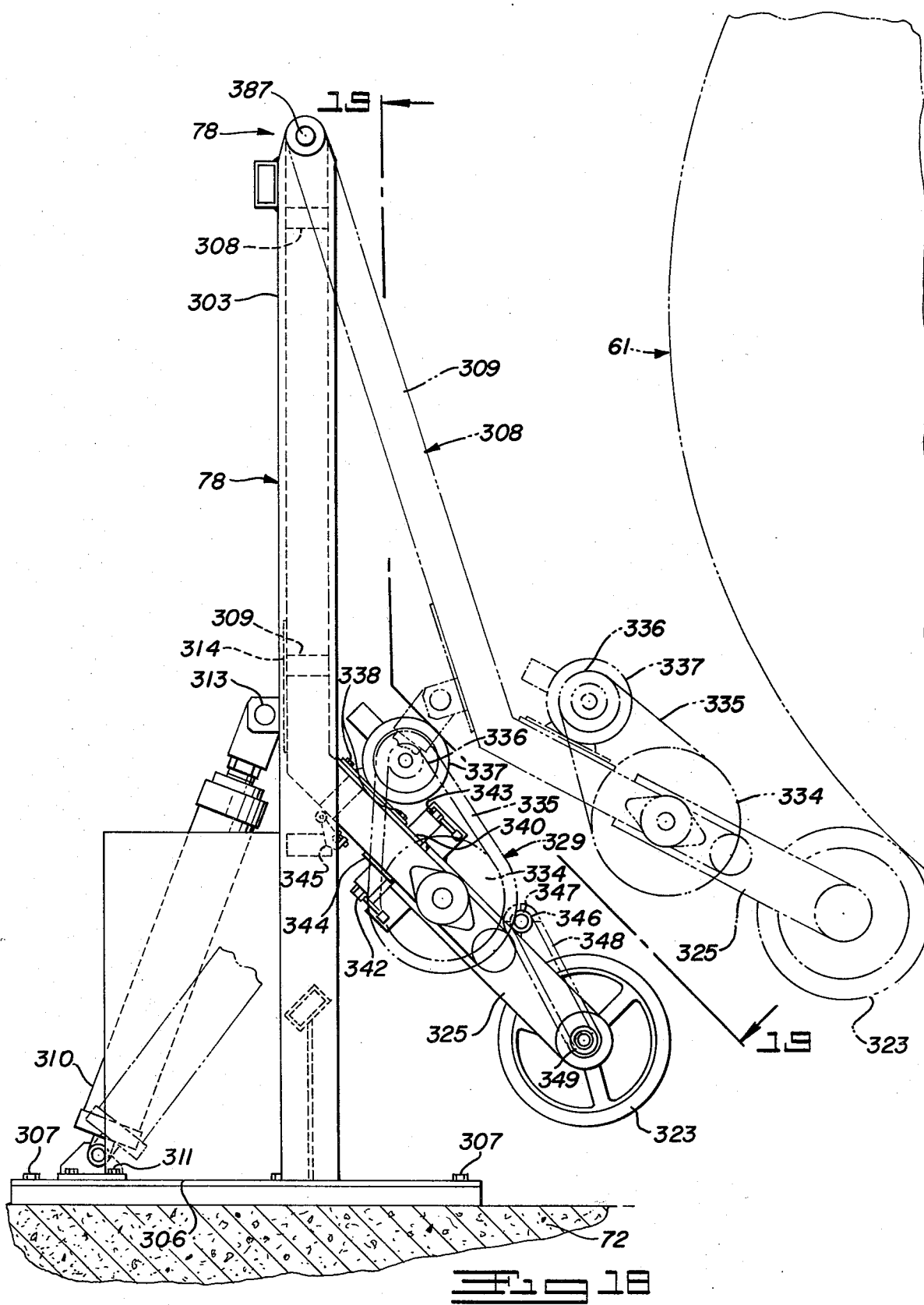
FIG. 18 is a side elevational view of a stitcher utilized in the present invention taken along line 18—18 in FIG. 3.

The breaker assembly is then stitched to the tire carcass preferably by providing resultant movement of a stitcher wheel substantially along the direction of cords in the outer ply of the breaker assembly. The breaker assembly can thus be stitched to the carcass with substantial uniformity, and wrinkling along the edges of the breaker assembly can be avoided. The best embodiment contemplated for construction and operation of the method of stitching is described by reference to FIGS. 3, 18 and 19.

Stitching mechanism 78 is comprised of vertical frames 303 and 304 centered on the ideal or reference radial centerline relative to the second stage tire building machine and fastened by fillet welds 305 to base 306, which is, in turn, fastened to floor 72 by bolts 307. Supported on the frames is retraction means 308 for extending the stitcher wheel to and from contact with the breaker assembly and tire carcass. Retraction means 308 comprises extension arms 309, having an angular portion extending downwardly toward detachable drum 61, pivotally mounted by axle shaft 387 at the upper ends of vertical frames 303 and 304, respectively. Extension arms 309 are supported and pivotally moved to and from contact with the breaker assembly and tire carcass by air cylinder 310. Air cylinders 310 are pivotally mounted by brackets 311 to base 306 and pivotally mounted by brackets 313 to mounting plate 314 extending between arms 309. Arms 309 are connected and reinforced by cross arms 315, 316 and 317 and mounting plate 318, and by vertical struts 319, 320, 321 and 322 so that a single unitized support structure is provided for the stitcher wheel and drive therefor.

Stitching mechanism 78 also includes stitcher wheel 323 for performing the actual stitching operation. Stitcher wheel 323 is rotatably mounted by ball bearings 324 in yoke 325, which is slidably fastened to move axially along building drum 61 on spline 326. Spline 326 is in turn rigidly supported by spline end caps 327 and bolts 328 to arms 309.

Drive means 329 is also provided for driving stitcher wheel 323 substantially axially of detachable building drum 61. Drive means 329 comprises ball screw 330 rotatably mounted by ball bearings 331 and bolts 332 on extension arms 309, and ball screw nut 333 fastened to yoke 325 and engaging ball screw 330. Also rigidly fastened to end portions of ball screw 330 is pulley 334, which is driven through pulley belt 335 and pulley 336 by variable speed, reversible electric motor 337. Electric motor 337 is fastened by bolts 338 to mounting plate 318.

The operation of stitching mechanism 78 is preferably controlled by a series of limit switches to perform the method of the present invention. Specifically, limit switches 339 and 340 are slidably mounted on rail 341, and limit switches 342 and 343 are slidably mounted on rail 344, which rails are in turn mounted along plate 318 so that the limit switches can be adjusted axially along drum 61 for stitching different size tires. One limit switch 345 is also positioned on vertical frame 303 to control the stitching operation as hereinafter described.

With this apparatus, the stitching operation of the present invention is performed as follows: Retraction means 308 is actuated to bring stitcher wheel 323 into contact with the breaker assembly, positioned over the tire carcass on building drum 61 at the first intermediate starting point near the circumferential centerline of the breaker assembly. Hydraulic motor 88 is then actuated to rotate building drum 61 and in turn rotates stitcher wheel 323 in contact therewith; simultaneously, drive means 329 is actuated to independently drive stitcher wheel 323 axially along building drum 61. By this combination drive, stitcher wheel 323 is caused to travel over the breaker assembly toward an edge portion thereof substantially along the direction of cords in outer plies of the breaker assembly.

Limit switch 339 or 340, as the case may be, is positioned to stop motor 88 and drive means 329 just after the stitcher wheel 323 contacts the tire carcass beyond the edge of the breaker assembly, and to actuate retraction means 308 to disengage stitcher wheel 323 from the tire carcass. On retraction of retraction means 308, limit switch 345 is actuated and causes drive means 329 to rotate ball screw 330 in reverse preferably at a high speed. Stitcher wheel 323 is thereby moved back toward the circumferential centerline of the tire until limit switch 341 is actuated prior to the first intermediate starting point of initial contact of stitcher wheel 323 with the breaker assembly to provide for overlapping stitching.

Actuation of limit switch 341 stops the axial movement of stitcher wheel 323 and starts extension of retraction means 308 to again contact the breaker assembly over the tire carcass on building drum 61 at a second intermediate starting point. Hydraulic motor 88 and drive means 329 are then again actuated to drive building drum 61 and stitcher wheel 323 both in the opposite direction from their direction of travel during the first part of the stitching operation. By this combination drive, stitcher wheel 323 is again caused to travel over the breaker assembly again along the direction of cords in the outer plies of the breaker assembly, but this time across the first intermediate starting point to the opposite edge portion of the breaker assembly.

Limit switch 339 or 340, as the case may be, is again positioned to stop motor 88 and drive means 329 just after stitcher wheel 323 contacts the tire carcass beyond the breaker assembly, and to actuate retraction means 308 to disengage stitcher wheel 323 from tire carcass—the stitching operation being completed. On retraction of retraction means 308, limit switch 345 is actuated and causes drive means 329 to rotate ball screw 330 in reverse direction preferably at a high speed and return stitcher wheel 323 to the circumferential center of the tire to await stitching operations on the next breaker assembly and tire carcass.

Preferably, the linear speed of stitcher wheel 323 along spline 326 is varied according to the linear surface speed of the portion of the breaker assembly contacting stitcher wheel 323. The operation is accomplished utilizing tachometer 346 to vary the speed of motor 337. Tachometer 346 is mounted on yoke 325 and is connected by timing pulley 347 on a common shaft with tachometer 346, timing belt 348 and timing pulley 349 on a common shaft with stitcher wheel 323 to stitcher wheel 323. By this arrangement, the rate of movement of stitcher wheel 323 across the breaker assembly will be varied with the change in rotational speed of the building drum 61 and the stitcher wheel 323 can be made to provide a uniform overlap across the breaker assembly regardless of speed of building drum 61 or the diameter of the breaker.

APPLICATION OF THE TIRE TREAD

After stitching, tread rubber is applied over the breaker assembly and tire carcass positioned on detachable building drum 61. The tire tread is preferably applied in strips of rubber from strip treader 80 through strip tread feeder 79 and systematically wound in overlapping plies around drum 61. Strip treader 80 and strip tread feeder 79 are known apparatus such as that described in U.S. Pat. No. 3,549,442. A preferable apparatus is Model 610 made by AMF.

It is important to strip treading that the carcass and breaker assembly be precisely positioned with reference to detachable building drum 61 and the second stage building machine ideal or radial reference centerline.

The head of strip tread feeder 79 preferably moves repeatedly back and forth along a fixed curvilinear route relative to detachable drum 61 symmetrically of a fixed radial centerline through the building drum, while building drum 61 is rotated to build the tread symmetrically over the carcass and breaker assembly. The carcass and breaker assembly is fixed relative to the radial reference centerline by centering and mating stages of the shaping operation hereinbefore described.

DISMOUNTING OF THE ASSEMBLED TIRE FROM THE SECOND STAGE TIRE BUILDING MACHINE

On completion of the strip treading operation, the assembly of the pneumatic tire in accordance with the present invention is completed. The tire is ready for dismounting from the second stage tire building machine, and curing.

The dismounting of the assembled tire is commenced by locking up detachable building drum 61. The lock-up is performed by extending head stock and tail stock thrust means 82 and 124 to engage seal 161 on barrel 160 with second bladder clamp ring 159. Seal 161 forms a hermetic seal between barrel 160 and second bladder ring 159 and closes off volume 350 (see FIG. 11) defined by bladder 155, first and second bladder clamp rings 158 and 159 and barrel 160. Plugs 187 are then removed from openings 186 in pick-up ring 173, and lock means 175 are locked by rotating the three eccentrics 181 through openings 186. Eccentrics 181 cause locking segments 176 to move radially outwardly to engage corresponding lip 185 around end portions of barrel 160 as above described more fully.

Plugs 187 are then replaced. Shaping bladder 155, with the assembled pneumatic tire thereon, is thus sealed and locked in an inflated toric configuration.

Tail stock thrust means 124 is then retracted to disengage pilot spindle 147 of tail pilot assembly 135 from the extends of first shaft 63. Rotational means 81 is then operated to move detachable building drum 61 with the assembled tire thereon from the horizontal to the vertical position. The rotation is accomplished by operating hydraulic rotary actuators to pivot head stock 64 about shaft 95 and permit head stock 64 to rotate into well 153 in floor 72.

On reaching the vertical position, detachable building drum 61 is prepared for detachment from first shaft 63 by unclamping pins 205 and removing drive ring 202 from the assembly next bayonet lock ring 195 is removed. Lock nuts 192 are then loosened and lock bolts 193 are turned to disengage lip of lock bolt from lip 194 of first bladder seat ring 165. Bladder stretch sleeve 105 is disengaged from first bladder seat ring 165 by retracting head stock thrust means 82. An overhead crane or the like (not shown) is then positioned over detachable building drum 61 and attached to pick-up ring 173 by suitable means. Detachable drum 61, including the upper assembly as shown in solid line in FIG. 10, is then lifted and dismounted from first shaft 63 and the second stage tire building machine. The assembled tire is maintained on the drum in a toric, inflated configuration so that the tire, still uncured, does not destructively flex and distort of its own weight. Outboard tube 191 and bladder stretching rod 197 remain with the second stage machine for the next assembly operation. After removing the tire from the machine and placing it on a transporting truck pick-up ring 173 is removed. Any further lifting of detachable drum 61 is accomplished by use of a special lifting spider (not shown) which attaches to the drum in the same manner as pick-up ring 173.

CURING OF THE ASSEMBLED TIRE

On dismounting the assembled tire from the second stage tire building machine, the tire still in a toric, inflated configuration on the detachable tire building drum 61 is prepared for curing by lubricating the exposed surfaces of the tire. The lubrication is preferably accomplished by stopping the detached assembly at a lubricating station and lubricating, for example, by spraying the exposed portion of the tire.

The curing of the assembled tire is described by reference to FIG. 20. Detachable building drum 61 with the assembled tire thereon in a toric, inflated configuration is disposed in curing means 351 to cure the assembled tire.

Curing means 351 comprises pressurized cylindrical vessel 352 supported by base 353 and fastened to cylindrical base by clamping ring 354. Positioned within vessel 352 and extending through base 353 into well 355 in floor 72 is hoist means 356 for supporting the curing mold, with the tire and detachable building drum 61 therein within vessel 352. Hoist means 356 comprises vesselized hydraulic cylinder 357 with piston 358 slidably positioned therein with supporting platform 359 thereon. Piston 358 is also slidably guided by collar 360 symmetrically positioned in the bottom of vessel 352. By this arrangement, curing means 351 can be prepared for positioning the tire for curing by actuating the hydraulic cylinder 357 and position platform 359 to height. Note that depending on the dimensions of vessel 352, hoist means 356 may be positioned to contain and simultaneously cure more than one tire assembly at a time.

Bottom mold 361 of cylindrical curing mold 362, containing the tread design, is then positioned on a platform 359; and detached building drum 61 with the assembled tire in a toric, inflated configuration thereon is positioned in bottom half 361. Air coupling (not shown) is made to drum 61 to permit further pressurization of the tire, and steam coupling (not shown) is made to bottom half 361 which has steam passageways 363 therein. Top mold half 364 of curing mold 362 is then positioned in mated relation with bottom half 361, and steam coupling (not shown) is made to the steam passageway 365 in the mold top half.

Curing means top 366 is then locked to the top of vessel 352 by lock ring 357. Cylinder 357 is pressurized to clamp mold halves 361 and 364 together. The tire is then pressurized to extend the tire tread into the tread design in cylindrical curing mold 362, and steam is fed to curing mold 362 to provide for curing.

On completion of the cure, curing means top 366 is removed. The cured tire is then partially deflated to disengage the tire from curing mold 362, and top mold half 364 is removed. Detachable building drum 61 is then removed along with the cured tire still in the toric inflated configuration.

STRIPPING THE TIRE FROM THE DETACHABLE TIRE BUILDING DRUM

After curing, detachable building drum 61 with the assembled tire thereon in a toric, inflated configuration is transferred to stripping post 370 by overhead crane or truck.

Drum 61 is positioned on mounting plate 371 mounted on elevator 372 with first bladder seat ring 165 seated on mounting plate 371. Eccentric locking lugs 375 are actuated by a mechanism (not shown) to rotate to the position shown thus engaging lip 194 of first bladder seat ring 165 and attaching lower assembly drum 61 to mounting plate 371.

Bladder stretching cylinder 374 is rigidly attached to mounting plate 371 and has piston rod 373 extendable through mounting plate 371 and center of drum 61 for purposes of stretching shaping bladder 155 as hereinafter described. Hoist means 377 is comprised of electric motor 378 driving cable wind up drum 379 through speed reducer 388 and cables 389 attached to elevator 372. Elevator 372 is guided in tracks 390 by wheels 391 to maintain the stripping mechanism in a vertical position.

By this arrangement detachable building drum is stripped from the tire by first extending piston rod 373 until it is engaged with upper end of drm 61. Piston rod 373 is then retracted pulling the upper end of drum 61 down and relieving lock means 175 (see FIG. 1). Lock means 175 is then unlocked by turning eccentric 181 to slide locking segments 176 radially inward along slots 179 and 180. Then piston rod 373 is extended to stretch and strip bladder 155 away from inner surface of tire 392 as shown in FIG. 21. As soon as seal 161 is separated from second bladder clamp ring 159 air from inside bladder 155 is allowed to exhaust through the upper end of drum 61. Next second bead ring 171 is removed and entire drum 61 is lowered through the tire by operating hoist means 377 to lower elevator 372 until the upper end of drum 61 is below floor level and the tire is left supported by floor 72.

While the presently preferred embodiments of the invention and the preferred methods of performing the invention have been specifically described, it is distinctly understood that the invention may be otherwise variously embodied and performed.

What is claimed is:

1. A method of making a pneumatic tire comprising the steps of:
   A. positioning a tire carcass around an inflatable detachable building drum positioned on a first shaft;
   B. forming a breaker assembly around a collapsible breaker building drum positioned on a second shaft coaxial with said first shaft;
   C. transporting said breaker assembly by a breaker transport support means from said breaker building drum to around said detachable building drum;
   D. inflating said detachable building drum and said tire carcass thereon to a toric shape and mating said carcass with said beaker assembly;
   E. stitching said breaker assembly to said tire carcass;
   F. applying tread rubber to said stitched breaker assembly and tire carcass to form an assembled tire; and
   G. dismounting said detachable building drum with said assembled tire in an inflated toric configuration thereon from said first shaft.

2. A method of making a pneumatic tire as set forth in claim 1 wherein:
   step E includes contacting said breaker assembly with a stitcher wheel and causing the stitcher wheel to travel over said breaker assembly in a bias direction substantially along the direction of cords in the outer ply of said breaker assembly.

3. A method of making a pneumatic tire as set forth in claim 2 wherein:

step E includes varying the lateral speed of said stitcher wheel in correspondence to change in circumference of portions of said breaker assembly contacting said stitcher wheel and in correspondence to the rotational speed of said detachable building drum.

4. A method of making a pneumatic tire as set forth in claim 1 comprising the additional step of I positioning detachable building drum with the assembled tire thereon, and curing the tire while maintaining the tire in an inflated toric configuration.

5. A method of making a pneumatic tire comprising the steps of:
   A. rotating a head stock of a tire building machine until a first shaft thereof is vertically positioned;
   B. positioning a detachable tire building drum with a shaping bladder on said first shaft;
   C. positioning a tire carcass over said shaping bladder of said detachable tire building drum;
   D. rotating said head stock of said tire building machine until said first shaft thereof, with said detachable tire building drum thereon is horizontally positioned;
   E. inflating said shaping bladder of the tire building drum, while having opposed shoulder portions of said drum move toward each other, to form said tire carcass into a toric configuration;
   F. locking said shoulder portion of said building drum in position and sealing a volume within said shaping bladder with said tire carcass over said shaping bladder in an inflated toric configuration;
   G. rotating said head stock of the tire building machine until said first shaft thereof, with said detachable tire building drum thereon, is vertically positioned;
   H. dismounting said detachable building drum, with said tire carcass in an inflated toric configuration thereon, from said first shaft;
   I. positioning said detachable building drum with said assembled tire thereon in a curing means and curing said tire while maintaining said tire in an inflated toric configuration.

6. A method of making a pneumatic tire as set forth in claim 5 comprising the additional step between steps B and C of:
   stretching the shaping bladder to a cylindrical configuration.

7. A method of making a pneumatic tire as set forth in claim 5 comprising the additional steps between steps D and E of:
   (i) seating bead portions of the tire carcass in bead ring portions of the detachable tire building drum; and
   (ii) centering the building drum, with the tire carcass thereon, relative to a fixed reference point in the tire building machine.

8. A tire building machine comprising:
a drive shaft in cantilever at one end,
an expandible building drum having inboard and outboard shoulders and adapted to be detachably mounted on said drive shaft, said drum including:
   a shaping bladder with bead portions, for shaping a tire carcass positioned thereover to a toric configuration for application of breaker and tread portions;
   inboard and outboard bladder clamp means for separately engaging said bead portions to support said shaping bladder, said clamp means being adapted for supporting said detachable drum on said drive shaft;
   inboard and outboard means for seating bead portions of a tire carcass positioned over said shaping bladder supported adjacent respective inboard and outboard bladder clamp means;
first thrust means for moving said inboard clamp means and bead seating means independent of said outboard clamp means and bead seating means, and second thrust means for moving said outboard clamp means and bead seating means independent of said inboard clamp means and bead seating means to move said respective clamp means and bead seating means toward and away from one another;
means for locking together said inboard and outboard bladder clamp means with a tire carcass positioned over said shaping bladder in a toric configuration; and
means for sealing an internal volume within said shaping bladder to maintain said shaping bladder in a toric configuration when said bladder clamp means is in its locking condition.

9. Apparatus as defined in claim 8 including:
means for pivoting said drive shaft between vertical and horizontal positions to provide for vertical positioning of said detachable building drum and said tire carcass, and for vertical dismounting of said detachable tire building drum with said tire carcass and breaker and tread portions thereon.

10. A tire building machine as defined in claim 8 comprising:
   a second rotatable building drum for assembling a breaker assembly, mounted on a second drive shaft coaxially of said drive shaft, said second building drum having means for increasing and decreasing the diameter of said drum to enable the breaker assembly to be removed from said second building drum; and
   a transfer means for gripping said breaker assembly on said second building drum and transferring said breaker assembly to said detachable building drum.

11. A tire building machine for producing pneumatic tires as set forth in claim 10 wherein:
   said transfer means comprise a plurality of electromagnets positioned about a circumferential ring to magnetically grip said breaker assembly by utilization of magnetic forces on ferromagnetic metal reinforcing cords in said breaker assembly.

12. A tire building machine for producing pneumatic tires as set forth in claim 10 whereon:
   said second building drum has outer surface portions covered with a magnetic material to facilitate assembly of a breaker assembly containing metal reinforcing cords.

13. A tire building machine for producing pneumatic tires as set forth in claim 10 wherein:
   said second thrust means extends through said second shaft to engage said drive shaft.

14. A detachable tire building drum as set forth in claim 8 wherein:
   said lock means comprises a lip positioned circumferentially about said inboard bladder clamp ring, and a plurality of lock segments slidably positioned about said outboard bladder clamp ring and capable of engaging said lip of said first bladder ring to provide for locking.

15. A tire building machine for producing pneumatic tires as set forth in claim 8 comprising in addition:

E. a stitching means for stitching said breaker assembly to the tire carcass, said stitching means having a stitcher wheel for contacting said breaker assembly, a means for driving said stitcher wheel independent of said detachable building drum to permit said stitcher wheel to travel over said breaker assembly in a bias direction substantially along the direction of cords in the outer ply of said breaker assembly.

16. A tire building machine for producing pneumatic tires as set forth in claim 10 wherein:

said transfer means is comprised of a plurality of electromagnetic gripping means positioned about a circumferential ring, and adapted to radially extend inwardly and magnetically grip said breaker assembly by utilization of magnetic forces on ferromagnetic metal reinforcing cords in said breaker assembly.

17. A tire building machine for producing pneumatic tires as set forth in claim 10 wherein:

said second building drum has outer surface portions covered with a magnetic material to facilitate assembly of a breaker assembly containing metal reinforcing cords.

18. A tire shaping apparatus, which comprises:

a fixed frame;

a swing frame swingable mounted on said fixed frame;

swinging means for swinging said swing frame from a horizontal position to a vertical position;

a tubular sleeve slidably journaled on said swing frame;

a main rotary shaft slidably coupled with said tubular sleeve, a pressured fluid conduit extending in the axial direction of the sleeve and shaft and opened at one end;

actuating means for sliding said sleeve and rotary shaft relative to each other;

rotating means for rotating said sleeve and rotary shaft; and a tire shaping drum including an upper bead ring assembly detachably mounted on said one end of said main rotary shaft and having an annular member with a circumferential extending groove in one side wall thereof, a lower bead ring assembly detachably mounted on one end of said sleeve and having an annular member with a circumferentially extending projection on one side wall thereof facing said upper bead ring assembly so as to be hermetically coupled with said groove, an elastic tubular member with opened ends hermetically sealed with said upper and lower bead ring assemblies so as to be capable of forming a sealed chamber by hermetically coupling said projection of said lower bead ring assembly and said groove of said upper bead ring assembly, said elastic tubular member being in communication with said conduit so that said elastic tubular member is inflated when pressurized fluid is delivered through said conduit, lock means for coupling said annular members of said upper and lower bead ring assemblies to maintain the coupling between the groove and projection thereof, and lock control means for controlling said lock means to couple and decouple said annular members of said upper and lower bead ring assemblies from outside said upper bead ring assembly.

19. A tire shaping apparatus as claimed in claim 18, in which said annular member of said upper bead ring assembly has a plurality of recesses extending radially outwardly from the inner surface thereof and circumferentially spaced at substantially equal distances, said lock means including a plurality of arcuate shell members each having an intermediate portion slidably received in each of said recesses of said annular member of said upper bead ring assembly and a pair of projections extending radially outwardly at both the ends of said intermediate portion to hold radially inner end portions of said annular members of said upper and lower bead ring assemblies, said projection opposite to said annular member of said upper bead ring assembly having an axially extending bore, said lock control means including a plurality of cam rods each rotatably supported by said upper bead ring assembly in parallel with said main rotary shaft and having one portion rigidly supporting a cam member engaged in said axially extending bore, one end of each cam rod accessable from outside said upper bead ring assembly for facilitating manual operation of said cam rod from the outside of said upper bead ring assembly.

20. A tire shaping apparatus as claimed in claim 18, in which said swinging means includes a fluid operated movement means fastened to said fixed frame and connected to said swing frame, said swing frame being pivotally mounted on said fixed frame.

21. A tire shaping apparatus as claimed in claim 18, in which said actuating means includes a pair of radial bearings respectively rotatably coupled with said sleeve and rotary shaft, and a fluid pressure means for moving said bearings relative to each other.

* * * * *